United States Patent [19]
Makino et al.

[11] Patent Number: 6,021,973
[45] Date of Patent: Feb. 8, 2000

[54] ROLL PHOTO FILM AND TAKE-UP SPOOL COMBINED THEREWITH

[75] Inventors: Teruyoshi Makino; Masami Sasou, both of Kanagawa, Japan

[73] Assignee: Fuji Photo Film Co., Ltd., Kanagawa, Japan

[21] Appl. No.: 09/115,266

[22] Filed: Jul. 14, 1998

[30] Foreign Application Priority Data

Jul. 15, 1997 [JP] Japan .................................. 9-190301
Sep. 22, 1997 [JP] Japan .................................. 9-256296
Apr. 2, 1998 [JP] Japan .................................. 10-090067

[51] Int. Cl.[7] ........................... B65H 75/28; G03B 17/26
[52] U.S. Cl. .................. 242/582; 242/584.1; 242/587.1; 242/160.4
[58] Field of Search ................. 242/584.1, 582, 242/587.1, 587.2, 587.3, 348.1, 348.4, 332.8, 160.4; 396/512, 513, 514, 516; 206/400, 410

[56] References Cited

U.S. PATENT DOCUMENTS 5,435,500  7/1995  Shibata .................................. 242/348.4
5,871,169  2/1999  Hasegawa ............................. 242/584.1

FOREIGN PATENT DOCUMENTS 0 763 768  3/1997  European Pat. Off. .

Primary Examiner—John M. Jillions
Attorney, Agent, or Firm—Sughrue, Mion, Zinn, Macpeak & Seas, PLLC

[57] ABSTRACT

A take-up spool to be set in a photo film take-up chamber is used with a roll photo film of the 120 type to be loaded in a photo film supply chamber. The take-up spool has a slit, formed in a spool core to extend in an axial direction, is open in first and second openings, and has first and second walls. A trapezoidal erect plate is disposed erectly on the first wall, oriented crosswise to the axial direction. The erect plate has first and second inclined edges, confronted respectively with the first and second openings, and inclined with reference to the first wall. A pair of lateral claws are disposed on respective lateral faces of the erect plate to extend in the axial direction. Two press ridges project from the second wall. In combination, the roll photo film includes a spool, a photo filmstrip, a trailer, a leader, and a retainer hole formed in the leader. The retainer hole receives insertion of the erect plate, and is retained by the lateral claws. In the retainer hole, a retaining region has a retaining edge, disposed farther from the photo filmstrip, and engaged with the lateral claws. A releasing region is formed with the retaining region to extend toward the photo filmstrip, for facilitating removal of the lateral claws.

19 Claims, 32 Drawing Sheets

FIG. 22

PAPER A, TYPE 1 (a = 0.34, H = 1.45)

| WIDTH D1 \ CLAW LENGTH L (mm) | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|
| 29 | △ | △ | × | × | × | × | × | × | × | × | × | × | × |
| 27 | O | O | × | × | × | × | × | × | × | × | × | × | × |
| 25 | O | O | △ | × | × | × | × | × | × | × | × | × | × |
| 23 | O | O | △ | △ | × | × | × | × | × | × | × | × | × |
| 21 | O | O | △ | O | O~△ | × | × | × | × | × | × | × | × |
| 19 | O | O | O | O | O~△ | △~× | × | × | × | × | × | × | × |
| 17 | O | O | O | O | O~△ | △ | △ | × | × | × | × | × | × |
| 15 | O | O | O | O | O | O | O | O~△ | △ | △ | × | × | × |
| 13 | O | O | O | O | O | O | O | O~△ | △ | O~△ | × | △ | △ |
| 11 | O | O | O | O | O | O | O | O | O | O | O | △ | △~× |

FIG. 23

| PAPER A | CLAW LENGTH L (mm), TYPE 2 (a = 0.49, H = 1.25) | | | | | | | | | | | | |
|---|---|---|---|---|---|---|---|---|---|---|---|---|---|
| | | 1.3 | 1.4 | 1.5 | 1.6 | 1.7 | 1.8 | 1.9 | 2.0 | 2.1 | 2.2 | 2.3 | 2.4 | 2.5 |
| WIDTH D1 | 29 | ○ | ○ | × | × | × | × | × | × | × | × | × | × | × |
| | 27 | ○ | ○ | × | × | × | × | × | × | × | × | × | × | × |
| | 25 | ○ | ○ | × | × | △ | × | × | × | × | × | × | × | × |
| | 23 | ○ | ○ | △ | △ | ○ | × | × | × | × | × | × | × | × |
| | 21 | ○ | ○ | ○ | ○ | ○ | △ | × | △ | × | × | × | × | × |
| | 19 | ○ | ○ | ○ | ○ | ○ | ○ | ○ | ○ | × | × | × | × | × |
| | 17 | ○ | ○ | ○ | ○ | ○ | ○ | ○ | ○ | × | × | × | × | × |
| | 15 | ○ | ○ | ○ | ○ | ○ | ○ | ○ | ○ | ○ | △ | × | × | × |
| | 13 | ○ | ○ | ○ | ○ | ○ | ○ | ○ | ○ | ○ | △ | △ | × | × |
| | 11 | ○ | ○ | ○ | ○ | ○ | ○ | ○ | ○ | ○ | △ | ○ | ○ | ○ |

FIG. 24

| PAPER A | CLAW LENGTH L (mm), TYPE 3 (a = 0.49, H = 0.9) | | | | | | | | | | | | |
|---|---|---|---|---|---|---|---|---|---|---|---|---|---|
| | 1.3 | 1.4 | 1.5 | 1.6 | 1.7 | 1.8 | 1.9 | 2.0 | 2.1 | 2.2 | 2.3 | 2.4 | 2.5 |
| 29 | ○ | ○ | ○ | ○ | ○ | ○ | ○ | ◁ | × | × | × | × | × |
| 27 | ○ | ○ | ○ | ○ | ○ | ○ | ○ | ◁ | × | × | × | × | × |
| 25 | ○ | ○ | ○ | ○ | ○ | ○ | ○ | ○ | × | × | × | × | × |
| 23 | ○ | ○ | ○ | ○ | ○ | ○ | ○ | ○ | ◁ | × | × | × | × |
| 21 | ○ | ○ | ○ | ○ | ○ | ○ | ○ | ○ | ◁ | ◁ | × | × | × |
| 19 | ○ | ○ | ○ | ○ | ○ | ○ | ○ | ○ | ◁ | ◁ | ◁ | ◁ | ◁ |
| 17 | ○ | ○ | ○ | ○ | ○ | ○ | ○ | ○ | ○ | ◁ | ◁ | ◁ | ◁ |
| 15 | ○ | ○ | ○ | ○ | ○ | ○ | ○ | ○ | ○ | ◁ | ◁ | ◁ | ◁ |
| 13 | ○ | ○ | ○ | ○ | ○ | ○ | ○ | ○ | ○ | ◁ | ◁ | ◁ | ◁ |
| 11 | ○ | ○ | ○ | ○ | ○ | ○ | ○ | ○ | ○ | ◁ | ◁ | ◁ | ◁ |

WIDTH D1

FIG. 25

| PAPER B | CLAW LENGTH L (mm), TYPE 1 (a = 0.34, H = 1.45) | | | | | | | | | | | | |
|---|---|---|---|---|---|---|---|---|---|---|---|---|---|
| | 1.3 | 1.4 | 1.5 | 1.6 | 1.7 | 1.8 | 1.9 | 2.0 | 2.1 | 2.2 | 2.3 | 2.4 | 2.5 |
| 29 | ○ | ○ | ○ | ○ | ○ | ○ | ○ | ○ | ○ | ○ | × | × | × |
| 27 | ○ | ○ | ○ | ○ | ○ | ○ | ○ | ○ | ○ | ○ | △~× | △~× | × |
| 25 | ○ | ○ | ○ | ○ | ○ | ○ | ○ | ○ | ○ | ○ | △ | △ | × |
| 23 | ○ | ○ | ○ | ○ | ○ | ○ | ○ | ○ | ○ | ○ | △ | △~× | △~× |
| 21 | ○ | ○ | ○ | ○ | ○ | ○ | ○ | ○ | ○ | ○ | ○ | △ | × |
| 19 | ○ | ○ | ○ | ○ | ○ | ○ | ○ | ○ | ○ | ○ | ○ | ○ | △ |
| 17 | ○ | ○ | ○ | ○ | ○ | ○ | ○ | ○ | ○ | ○ | ○ | ○ | ○ |
| 15 | ○ | ○ | ○ | ○ | ○ | ○ | ○ | ○ | ○ | ○ | ○ | ○ | ○ |
| 13 | ○ | ○ | ○ | ○ | ○ | ○ | ○ | ○ | ○ | ○ | ○ | ○ | ○ |
| 11 | ○ | ○ | ○ | ○ | ○ | ○ | ○ | ○ | ○ | ○ | ○ | ○ | ○ |
| WIDTH D1 | | | | | | | | | | | | | |

FIG. 26

| PAPER B | CLAW LENGTH L (mm), TYPE 2 (a = 0.49, H = 1.25) | | | | | | | | | | | | |
|---|---|---|---|---|---|---|---|---|---|---|---|---|---|
| WIDTH D1 | | 1.3 | 1.4 | 1.5 | 1.6 | 1.7 | 1.8 | 1.9 | 2.0 | 2.1 | 2.2 | 2.3 | 2.4 | 2.5 |
| | 29 | ○ | ○ | ○ | ○ | ○ | ○ | ○ | ○ | ○ | ○ | △ | △ | △ |
| | 27 | ○ | ○ | ○ | ○ | ○ | ○ | ○ | ○ | ○ | ○ | ○ | △ | △ |
| | 25 | ○ | ○ | ○ | ○ | ○ | ○ | ○ | ○ | ○ | ○ | ○ | ○ | △ |
| | 23 | ○ | ○ | ○ | ○ | ○ | ○ | ○ | ○ | ○ | ○ | ○ | ○ | △ |
| | 21 | ○ | ○ | ○ | ○ | ○ | ○ | ○ | ○ | ○ | ○ | ○ | ○ | ○ |
| | 19 | ○ | ○ | ○ | ○ | ○ | ○ | ○ | ○ | ○ | ○ | ○ | ○ | ○ |
| | 17 | ○ | ○ | ○ | ○ | ○ | ○ | ○ | ○ | ○ | ○ | ○ | ○ | ○ |
| | 15 | ○ | ○ | ○ | ○ | ○ | ○ | ○ | ○ | ○ | ○ | ○ | ○ | ○ |
| | 13 | ○ | ○ | ○ | ○ | ○ | ○ | ○ | ○ | ○ | ○ | ○ | ○ | ○ |
| | 11 | ○ | ○ | ○ | ○ | ○ | ○ | ○ | ○ | ○ | ○ | ○ | ○ | ○ |

FIG. 27

| PAPER B | CLAW LENGTH L (mm), TYPE 3 (a = 0.49, H = 0.9) | | | | | | | | | | | | |
|---|---|---|---|---|---|---|---|---|---|---|---|---|---|
| | 1.3 | 1.4 | 1.5 | 1.6 | 1.7 | 1.8 | 1.9 | 2.0 | 2.1 | 2.2 | 2.3 | 2.4 | 2.5 |
| WIDTH D1 | | | | | | | | | | | | | |
| 29 | ○ | ○ | | | | | | | | | | | △ |
| 27 | ○ | ○ | ○ | | | | | | | | | △ | △ |
| 25 | ○ | ○ | ○ | ○ | ○ | ○ | ○ | ○ | ○ | ○ | ○ | ○ | ○ |
| 23 | ○ | ○ | ○ | ○ | ○ | ○ | ○ | ○ | ○ | ○ | ○ | ○ | ○ |
| 21 | ○ | ○ | ○ | ○ | ○ | ○ | ○ | ○ | ○ | ○ | ○ | ○ | ○ |
| 19 | ○ | ○ | ○ | ○ | ○ | ○ | ○ | ○ | ○ | ○ | ○ | ○ | ○ |
| 17 | ○ | ○ | ○ | ○ | ○ | ○ | ○ | ○ | ○ | ○ | ○ | ○ | ○ |
| 15 | ○ | ○ | ○ | ○ | ○ | ○ | ○ | ○ | ○ | ○ | ○ | ○ | ○ |
| 13 | ○ | ○ | ○ | ○ | ○ | ○ | ○ | ○ | ○ | ○ | ○ | ○ | ○ |
| 11 | ○ | ○ | ○ | ○ | ○ | ○ | ○ | ○ | ○ | ○ | ○ | ○ | ○ |

FIG. 28

PAPER C, CLAW LENGTH L (mm), TYPE 1 (a = 0.34, H = 1.45)

| WIDTH D1 | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|
| 29 | ○ | ○ | ○ | ○ | × | × | × | × | × | × | × | × | × |
| 27 | ○ | ○ | ○ | ○ | ○ | ○ | △ | × | × | × | × | × | × |
| 25 | ○ | ○ | ○ | ○ | ○ | ○ | △ | △ | × | × | × | × | × |
| 23 | ○ | ○ | ○ | ○ | ○ | ○ | ○ | △ | △~× | × | × | × | × |
| 21 | ○ | ○ | ○ | ○ | ○ | ○ | ○ | ○ | ○ | × | × | × | × |
| 19 | ○ | ○ | ○ | ○ | ○ | ○ | ○ | ○ | ○ | △ | △~× | × | × |
| 17 | ○ | ○ | ○ | ○ | ○ | ○ | ○ | ○ | ○ | ○ | △~× | △~× | △~× |
| 15 | ○ | ○ | ○ | ○ | ○ | ○ | ○ | ○ | ○ | ○ | ○ | △ | △ |
| 13 | ○ | ○ | ○ | ○ | ○ | ○ | ○ | ○ | ○ | ○ | ○ | ○ | ○ |
| 11 | ○ | ○ | ○ | ○ | ○ | ○ | ○ | ○ | ○ | ○ | ○ | ○ | ○ |

FIG. 29

| PAPER C | CLAW LENGTH L (mm), TYPE 2 (a = 0.49, H = 1.25) | | | | | | | | | | | | |
|---|---|---|---|---|---|---|---|---|---|---|---|---|---|
| | | 1.3 | 1.4 | 1.5 | 1.6 | 1.7 | 1.8 | 1.9 | 2.0 | 2.1 | 2.2 | 2.3 | 2.4 | 2.5 |
| WIDTH D1 | 29 | O | O | O | O | O | O | O | O | O | △ | × | × | × |
| | 27 | O | O | O | O | O | O | O | O | O | O | △~× | △ | × |
| | 25 | O | O | O | O | O | O | O | O | O | O | △~× | △ | × |
| | 23 | O | O | O | O | O | O | O | O | O | O | △~× | △ | △~× |
| | 21 | O | O | O | O | O | O | O | O | O | O | O | △ | △~× |
| | 19 | O | O | O | O | O | O | O | O | O | O | O | O | △ |
| | 17 | O | O | O | O | O | O | O | O | O | O | O | O | O |
| | 15 | O | O | O | O | O | O | O | O | O | O | O | O | O |
| | 13 | O | O | O | O | O | O | O | O | O | O | O | O | O |
| | 11 | O | O | O | O | O | O | O | O | O | O | O | O | O |

FIG. 30

PAPER C — CLAW LENGTH L (mm), TYPE 3 (a = 0.49, H = 0.8)

| WIDTH D1 | 1.3 | 1.4 | 1.5 | 1.6 | 1.7 | 1.8 | 1.9 | 2.0 | 2.1 | 2.2 | 2.3 | 2.4 | 2.5 |
|---|---|---|---|---|---|---|---|---|---|---|---|---|---|
| 29 | ○ | ○ | ○ | ○ | ○ | ○ | ○ | ○ | ○ | ○ | ○ | / | △ |
| 27 | ○ | ○ | ○ | ○ | ○ | ○ | ○ | ○ | ○ | ○ | ○ | △ | △ |
| 25 | ○ | ○ | ○ | ○ | ○ | ○ | ○ | ○ | ○ | ○ | ○ | △ | △ |
| 23 | ○ | ○ | ○ | ○ | ○ | ○ | ○ | ○ | ○ | ○ | ○ | △ | △ |
| 21 | ○ | ○ | ○ | ○ | ○ | ○ | ○ | ○ | ○ | ○ | ○ | ○ | ○ |
| 19 | ○ | ○ | ○ | ○ | ○ | ○ | ○ | ○ | ○ | ○ | ○ | ○ | ○ |
| 17 | ○ | ○ | ○ | ○ | ○ | ○ | ○ | ○ | ○ | ○ | ○ | ○ | ○ |
| 15 | ○ | ○ | ○ | ○ | ○ | ○ | ○ | ○ | ○ | ○ | ○ | ○ | ○ |
| 13 | ○ | ○ | ○ | ○ | ○ | ○ | ○ | ○ | ○ | ○ | ○ | ○ | ○ |
| 11 | ○ |   | ○ | ○ | ○ | ○ | ○ | ○ | ○ | ○ | ○ | ○ | ○ |

ROLL PHOTO FILM AND TAKE-UP SPOOL COMBINED THEREWITH

BACKGROUND OF THE INVENTION

1. Field of the Invention

The present invention relates to a roll photo film and a take-up spool combined therewith. More particularly, the present invention relates to a roll photo film and a take-up spool combined therewith, with an improvement in which a leader of the roll photo film can be easily inserted into and secured to the take-up spool.

2. Description Related to the Prior Art

There are plural known types of a roll photo film, including the 120 and 220 types. The roll photo film consists of a roll of a paper-fitted photo film. The paper-fitted photo film includes a photo filmstrip and light-shielding paper fitted thereon. The paper-fitted photo film is wound about a spool core of a supply spool in a rolled form. A leader of the light-shielding paper is bent in a position of approximately two (2) centimeters, and retained on the roll with an adhesive tape. In the 120 type of the roll photo film, the light-shielding paper is backing paper with a length greater than the photo filmstrip and is fitted on the whole of the back surface of the photo filmstrip. One end of the photo filmstrip is connected with the light-shielding paper by adhesive tape. In the 220 type of the roll photo film, the light-shielding paper is two sheets which are a leader sheet and a trailer sheet, which are connected respectively with a leading end and a trailing end. The photo filmstrip is longer than that of the 120 type, so as to increase the number of available frames to be exposed.

The supply spool has a structure standardized by ISO 732-1982, ANSI PHI 21-1980, JIS K7512-1985 and so forth. The supply spool has a pair of flanges formed on its ends for regulating respective edges of the light-shielding paper. A slit is formed in the spool core to extend in an axial direction.

To use the roll photo film, at first an empty used supply spool derived from the roll photo film used previously is set in a camera in a photo film take-up chamber, by way of a take-up spool. The leader of the light-shielding paper of the new roll photo film to be used is inserted in the slit of the take-up spool. A user's finger must manually hold the leader before the take-up spool makes at least one rotation, for the purpose of avoiding slipping the leader out of the slit. It is laborious for unfamiliar users to load a camera with the roll photo film manually.

EP-A 0 763 768 (corresponding to the commonly assigned U.S. patent application Ser. No. 08/712,387 now U.S. Pat. No. 5,845,869 and Japanese Patent Application No. 7-236993) discloses a combination of a retainer hole in the leader of the light-shielding paper and a retainer claw in the center of a wall of the slit of the spool. A pair of press ribs or ridges are formed on a remaining wall of the slit to push the light-shielding paper toward the retainer claw. The retainer claw is constituted by an erect plate and lateral claws. The erect plate is disposed on the wall. The lateral claws extend from the erect plate in the axial direction of the spool. The retainer hole has such a diameter as to receive the lateral claws at the same time. When the leader of the light-shielding paper is inserted in the slit of the take-up spool, the retainer hole of the light-shielding paper is engaged with the retainer claw of the take-up spool to retain the light-shielding paper on the take-up spool. It is possible to facilitate manual loading of the roll photo film into the camera, as there is no difficulty of manually holding the light-shielding paper with fingers.

There is a photo film holder in which a plurality of roll photo films are set before being used. Unexposed ones among the roll photo films in the holder are removed from it after taking exposures to the initial roll photo films. They are rewound in their originally wound forms of rolls, and tightly fastened with rubber bands thereabout before preservation. However the take-up spool of the above document is so constructed that it is not easy to separate the leader of the light-shielding paper from it once the leader is secured thereto. If the leader is forcibly removed, the retainer hole in it is partially damaged or broken. The leader cannot be retained to the take-up spool again when the roll photo film being still unexposed is used for next exposures.

In a photo laboratory, it is frequently necessary to separate the leader of the light-shielding paper from the take-up spool. It is not easy in the roll photo film of the above document to separate the leader from the take-up spool. The leader must be torn manually by an operator, fatiguing his hand excessively. Or the operation of tearing is not very efficient. The retainer hole could be enlarged to facilitate separation of the leader from the take-up spool. However this would cause unreliable retention of the leader to the take-up spool.

The take-up spool having the retainer claw has the appearance or contour identical with the take-up spool without a retainer claw. Should a user mistake a take-up spool without a retainer claw for one having the retainer claw, there occurs an error in winding the leader of the light-shielding paper about the take-up spool, because an end of the leader is not secured to, but has slipped out of, the take-up spool when the take-up spool is rotated only with the leader inserted in its slit.

SUMMARY OF THE INVENTION

In view of the foregoing problems, an object of the present invention is to provide a roll photo film and a take-up spool combined therewith, with an improvement in which a leader connected with the photo filmstrip can be easily separated from a retainer claw of a take-up spool after insertion of the leader into a slit of the take-up spool.

Another object of the present invention is to provide a roll photo film and a take-up spool combined therewith, with an improvement in which a front edge of a leader connected with the photo filmstrip is prevented from interfering with a retainer claw of a take-up spool in the course of insertion of the leader into a slit of the take-up spool.

In order to achieve the above and other objects and advantages of this invention, a take-up spool and a roll photo film are provided in combination. The take-up spool includes a spool core. A slit is formed in the spool core to extend in an axial direction, open in first and second openings, and defined between first and second walls. An erect plate is disposed to project from the first wall toward the second wall, extended crosswise to the axial direction, the erect plate having first and second inclined edges, confronted respectively with the first and second openings, and inclined with reference to the first wall. A pair of lateral claws are disposed on respective lateral faces of the erect plate to extend in the axial direction. At least one press rib is disposed to project from the second wall toward the first wall. The roll photo film includes a photo filmstrip, which has first and second ends. A trailer is disposed to project from the first end, the photo filmstrip being wound in a form of a roll with the trailer wound inwards. A leader is disposed to project from the second end, wound about the roll of the photo filmstrip, for preventing ambient light from being incident upon the photo filmstrip. At least one retainer hole is formed in the front end of the leader. The retainer hole includes a retaining region having a retaining edge, and engaged with the lateral claws. A releasing region is formed with the retaining region to extend toward the photo filmstrip, and having a size for allowing passage of the lateral claws.

In a preferred embodiment, the retainer hole further includes first and second corner portions, disposed between the releasing region and the retaining region, confronted with each other, arranged at an interval smaller than an open width of the releasing region in the axial direction of the take-up spool, for preventing the lateral claws from being offset from the retaining edge in the axial direction.

The retaining edge of the retaining region is arc-shaped. The lateral claws and the arc-shaped retaining edge satisfy a condition of:

$$K \geq 0.5 \text{ mm}$$

where K is defined by a formula of:

$$K=L-\{s^2+2a\cdot\sin\theta(r^2-s^2)^{1/2}-(a\cdot\sin\theta)^2\}^{1/2}$$

where L is a distance from an end of the lateral claws to a central position of the erect plate as viewed in the axial direction, a is a distance from the lateral claws to the first and second inclined edges in an inserting direction of the leader, θ is an inclining angle of the first and second inclined edges with reference to the inserting direction, r is a radius of the arc-shaped retaining edge, s is a half of a thickness of the erect plate with reference to the axial direction.

The lateral claws and the releasing region satisfy conditions of:

$$2L<\alpha\leq 6L \text{ and}$$

$$d<\beta<2d$$

where α is an open width of the releasing region in the axial direction, d is a width of the lateral claws in the inserting direction, β is an open width of the releasing region in the inserting direction.

To be precise, K is a length of an overlapped portion where an end of the lateral claws overlaps on the retaining edge with reference to the axial direction while the retaining region is engaged with the erect plate.

Furthermore a claw indicia is disposed on the spool core in an outside of the first wall, for indicating existence of the erect plate and the lateral claws.

Consequently the leader can be easily separated from the retainer claw of the take-up spool after insertion of the leader into the slit of the take-up spool.

In another preferred embodiment, the lateral claws satisfy a condition of:

$$L\leq[\{43.30+(a\cdot\sin\theta+H/\cos\theta)^2\}a\cdot\sin\theta/(a\cdot\sin\theta+H/\cos\theta)-(a\cdot\sin\theta)^2]^{1/2}$$

where L is a distance from an end of the lateral claws to a central position of the erect plate as viewed in the axial direction, a is a distance from the lateral claws to the first and second inclined edges in an inserting direction of the leader, θ is an inclining angle of the first and second inclined edges with reference to the inserting direction, H is a height of ends of the lateral claws confronted with the first and second openings with reference to the first wall.

The retainer hole satisfies a condition of:

$$2.8 \text{ mm} \leq r \leq 6 \text{ mm}$$

where r is a radius of the retainer hole.

The retainer hole and the lateral claws satisfy a condition of:

$$K \geq 0.5 \text{ mm}$$

where K is defined by a formula of:

$$K=L-\{s^2+2a\cdot\sin\theta(r^2-s^2)^{1/2}-(a\cdot\sin\theta)^2\}^{1/2}$$

where s is a half of a thickness of the erect plate with reference to the axial direction.

The leader is shaped without a bend line in the inserting direction.

The lateral claws are so shaped as to be prevented from interference with ends of a front edge of the leader while a center of the front edge contacts one of the first and second inclined edges during advance of the front edge in the slit.

The leader further includes a narrowed portion, disposed on the front edge, and having a predetermined reduced width. The at least one press rib is first and second press ribs, arranged at a predetermined interval equal to or greater than the predetermined reduced width.

Consequently a front edge of the leader is prevented from interfering with the retainer claw of the take-up spool in the course of insertion of the leader into the slit of the take-up spool.

In still another preferred embodiment, the leader has longitudinal loop rigidity of 200–400 g/mm with a width of 60 mm. The leader has a narrowed portion, disposed on a front edge thereof, and has a predetermined reduced width of 11–23 mm.

The leader is constituted by material produced from at least one selected from natural pulp, synthetic fiber, synthetic pulp, reprocessed pulp and wastepaper.

BRIEF DESCRIPTION OF THE DRAWINGS

The above objects and advantages of the present invention will become more apparent from the following detailed description when read in connection with the accompanying drawings, in which:

FIG. 22 is a table illustrating results of experiments with changes in the claw length L and the width D1 according to Type 1 by use of Paper A;

FIG. 23 is a table illustrating results of experiments with changes in the claw length L and the width D1 according to Type 2 by use of Paper A;

FIG. 24 is a table illustrating results of experiments with changes in the claw length L and the width D1 according to Type 3 by use of Paper A;

FIGS. 25–27 are tables illustrating results of experiments with changes in the claw length L and the width D1 by use of Paper B; and FIGS. 28–30 are tables illustrating results of experiments with changes in the claw length L and the width D1 by use of Paper C.

DETAILED DESCRIPTION OF THE PREFERRED EMBODIMENTS

Figure 1:
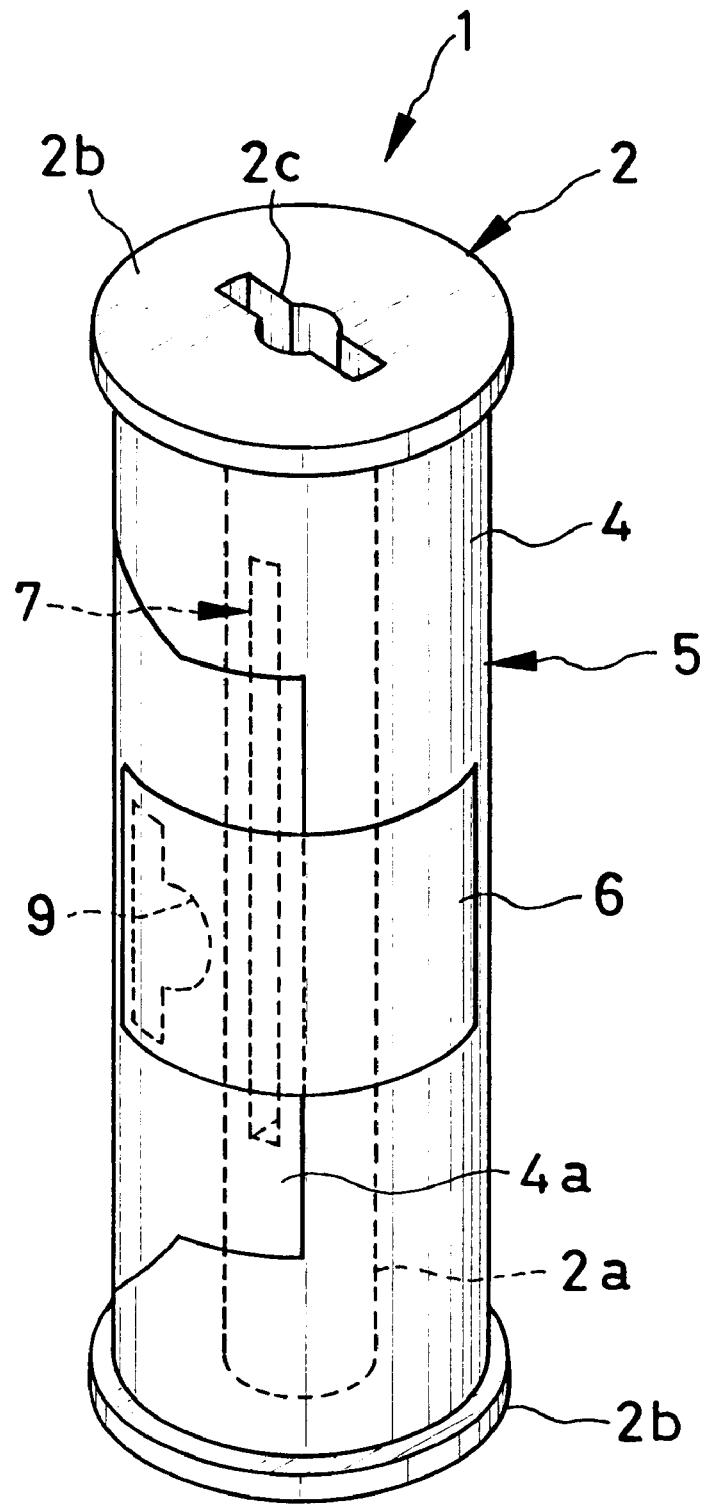
FIG. 1 is a perspective illustrating a roll photo film.

In FIG. 1, a roll photo film 1 of the present invention is illustrated. The roll photo film 1 essentially consists of a roll of a paper-backed photo film 5 of 120 type. The paper-backed photo film 5 includes a photo filmstrip 3 and light-shielding backing paper 4 fitted thereon. See FIG. 2. The paper-backed photo film 5 is wound about a spool core 2a of a supply spool 2 in a rolled form. A leader 4a of the backing paper 4 is retained with an adhesive tape 6. A first surface of the backing paper 4 oriented outwards when wound about the spool core 2a is a printed surface on which information is printed, including a manufacturer's name, and indication of 120 type. A second surface of the backing paper 4 oriented inwards as wound about the spool core 2a is a light-shielding surface on which a light-shielding black layer is formed. There are flanges 2b on axial ends of the spool core 2a. A key way 2c is formed in the center of each of the flanges 2b.

Figure 2:
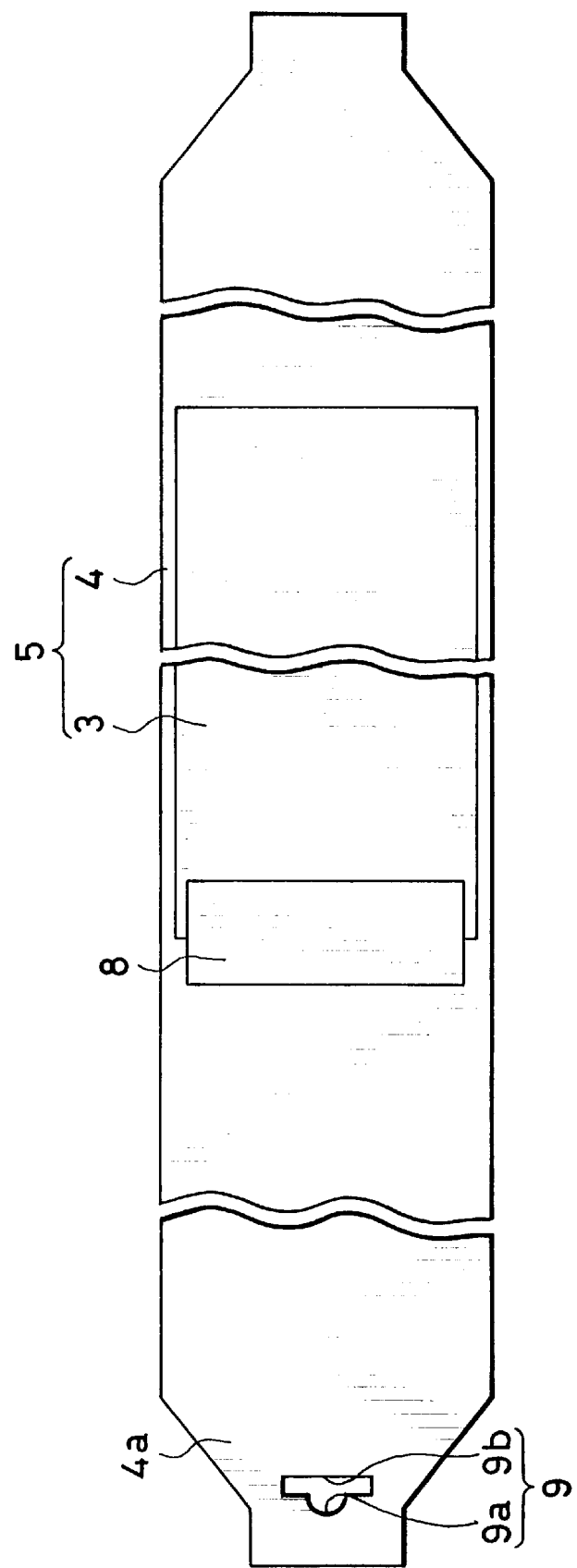
FIG. 2 is a plan, partially broken, illustrating a paper-backed photo film of the roll photo film of FIG. 1.

In FIG. 2, the paper-backed photo film 5 is unwound from the supply spool 2 and straightened. The backing paper 4 has a length greater than the photo filmstrip 3. The leader 4a of the backing paper 4 has a retainer hole 9, formed therein for being retained by a retainer claw of a take-up spool.

Figure 2A:
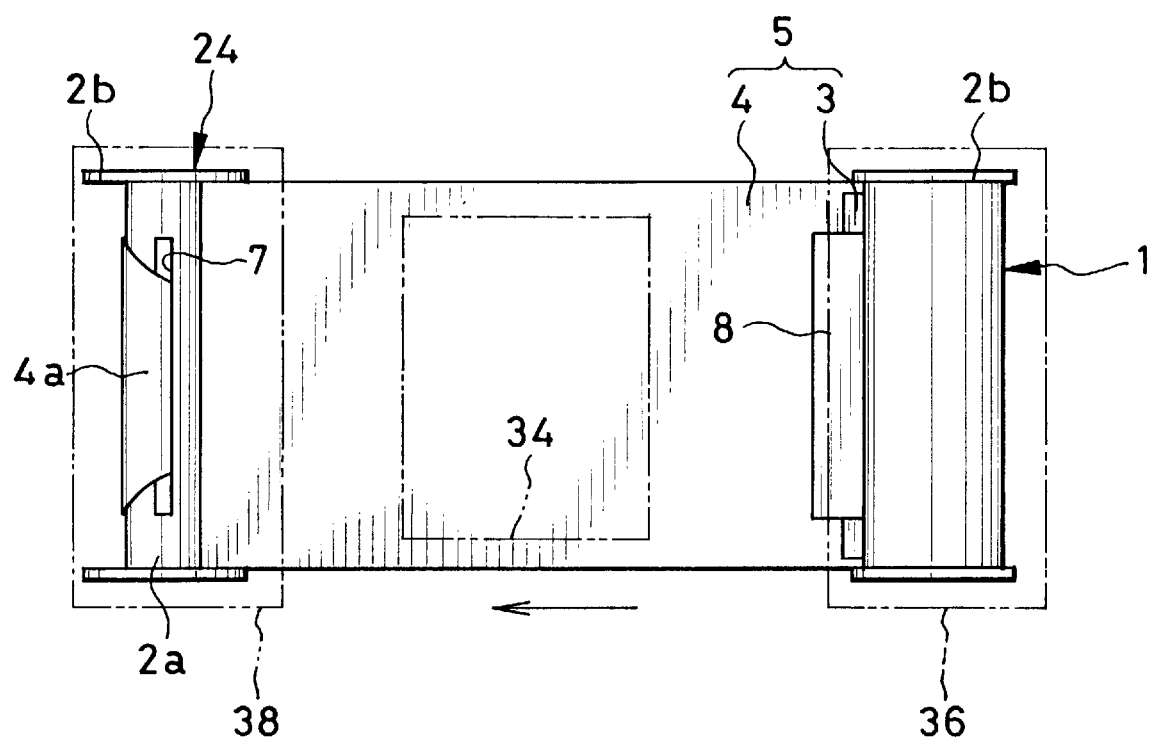
FIG. 2A is a plan illustrating a combination of a take-up spool and the roll photo film.

The roll photo film 1 is used as included in a combination of the roll photo film 1 and a take-up spool 24. See FIG. 2A. The take-up spool 24 consists of the supply spool 2 which has derived from a previous roll photo film 1, of which the photo film is used up and eliminated. Note that, in FIG. 2A, a photo film supply chamber 36 and a photo film take-up chamber 38 are formed in a Brownie camera. Details of the Brownie camera is suggested in U.S. Ser. No. 08/987,350.

The retainer hole 9 is formed in the backing paper 4. The retainer hole 9 includes a retaining region 9a and a releasing region 9b. The retaining region 9a is engaged with a retainer claw mechanism inside the take-up spool 24 for retaining the backing paper 4 to the take-up spool 24. The releasing region 9b is formed with the retaining region 9a and located between the retaining region 9a and the photo filmstrip 3, is rectangular and long in the width direction of the paper, and is adapted to release from the retainer claw mechanism by facilitating removal of the backing paper 4 from the take-up spool 24. The photo filmstrip 3 is overlapped on the backing paper 4 with a base surface of the photo filmstrip 3 contacted on a light-shielding black surface of the backing paper 4. A connective tape 8 is disposed for attaching a front end of the photo filmstrip 3 with the backing paper 4.

Figure 3:
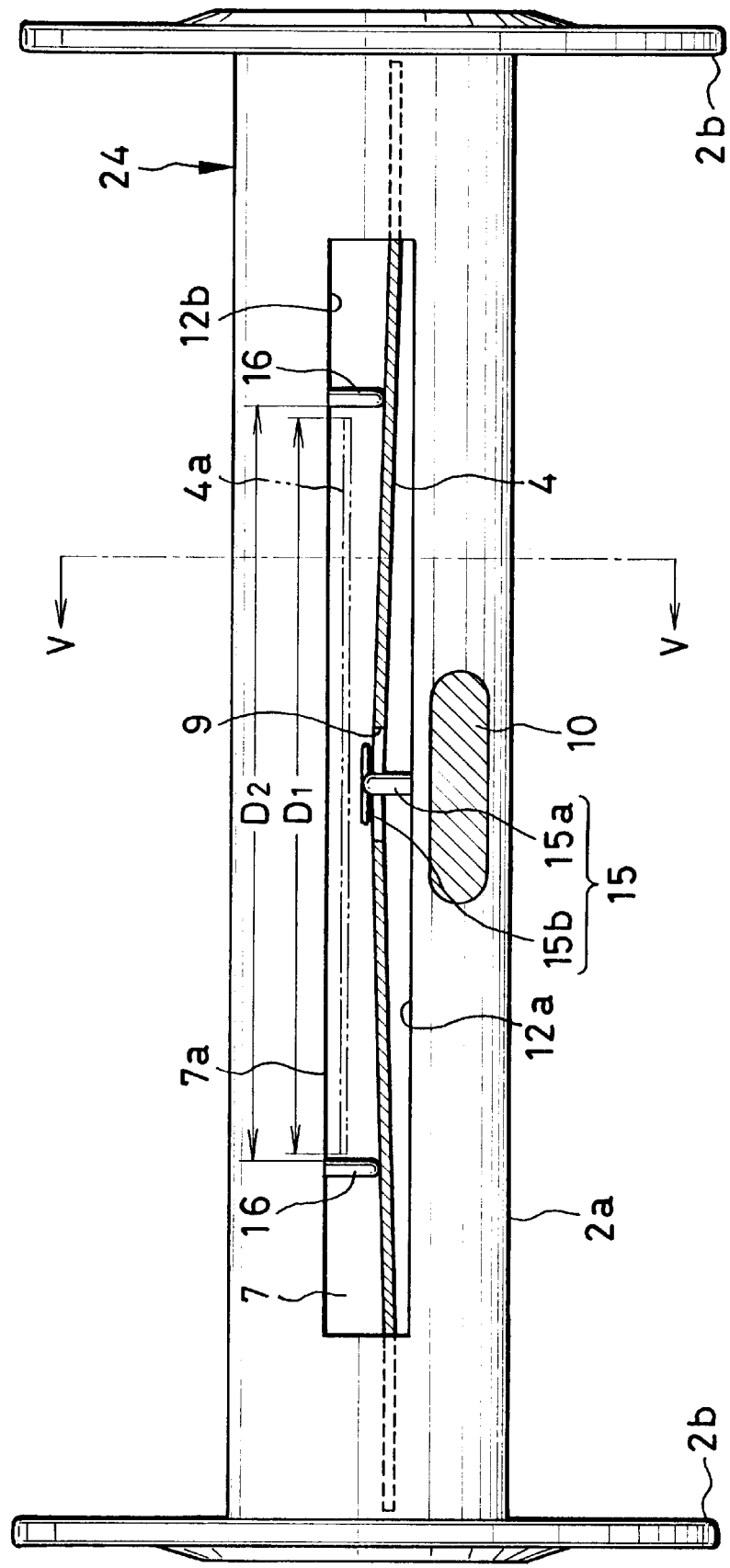
FIG. 3 is a front elevation, partially in section, illustrating the take-up spool with a leader of the roll photo film.

In FIG. 3, the take-up spool 24 is illustrated to view one opening 7a of the slit 7. One wall 12a of the slit 7 has a retainer claw mechanism 15 disposed at its center. The retainer claw mechanism 15 has a T-shape, and is engageable with the retainer hole 9 to retain the leader 4a to the spool core 2a of the take-up spool 24. An outer surface of the spool core 2a on the outside of the retainer claw mechanism 15 is provided with a claw indicia 10, which is hatched in the drawing, and indicates a structure of the take-up spool 24 or a supply spool 2 provided with the retainer claw mechanism 15. The claw indicia 10 can be formed by any of various suitable methods. For example, the supply spool 2 can be formed of resin of two colors, black and red, can be used to form the claw indicia 10 from the red resin, and to form the remainder from the black resin. Or else, the claw indicia 10 can be formed as a recess or a projection by use of a partial core or cavity of a mold to form the supply spool 2. The existence of the claw indicia 10 enables users to discern the take-up spool 24 having the retainer claw from a conventional spool without the retainer claw.

Of course the claw indicia 10 may be formed after forming the supply spool 2, and printed with a bright color. A sticker with the claw indicia 10 of a bright color may be attached on the supply spool 2.

The retainer claw mechanism 15 is constituted by an erect plate 15a and lateral claws 15b. The erect plate 15a is erect from the wall 12a vertically, and has a trapezoidal shape. The lateral claws 15b extend laterally from the top of the erect plate 15a. A wall 12b of a slit 7 includes a pair of press ribs or ridges 16, which are arranged symmetrically with respect to the retainer claw mechanism 15, for pushing the backing paper 4 toward the retainer claw mechanism 15. The retainer claw mechanism 15 and the press ribs 16 are shaped in a horizontally symmetrical manner as viewed through openings 7a and 7b. Also the retainer claw mechanism 15 and the press ribs 16 are symmetrical as viewed in the axial direction of the spool core 2a. The slit 7 is so constructed that both of the openings 7a and 7b can equally guide the leader 4a of the backing paper 4 toward the retainer claw mechanism 15. The interval D2 between the press ribs 16 is greater than the width D1 of the leader 4a. The leader 4a is guided toward the retainer claw mechanism 15 between the press ribs 16.

Figure 4:
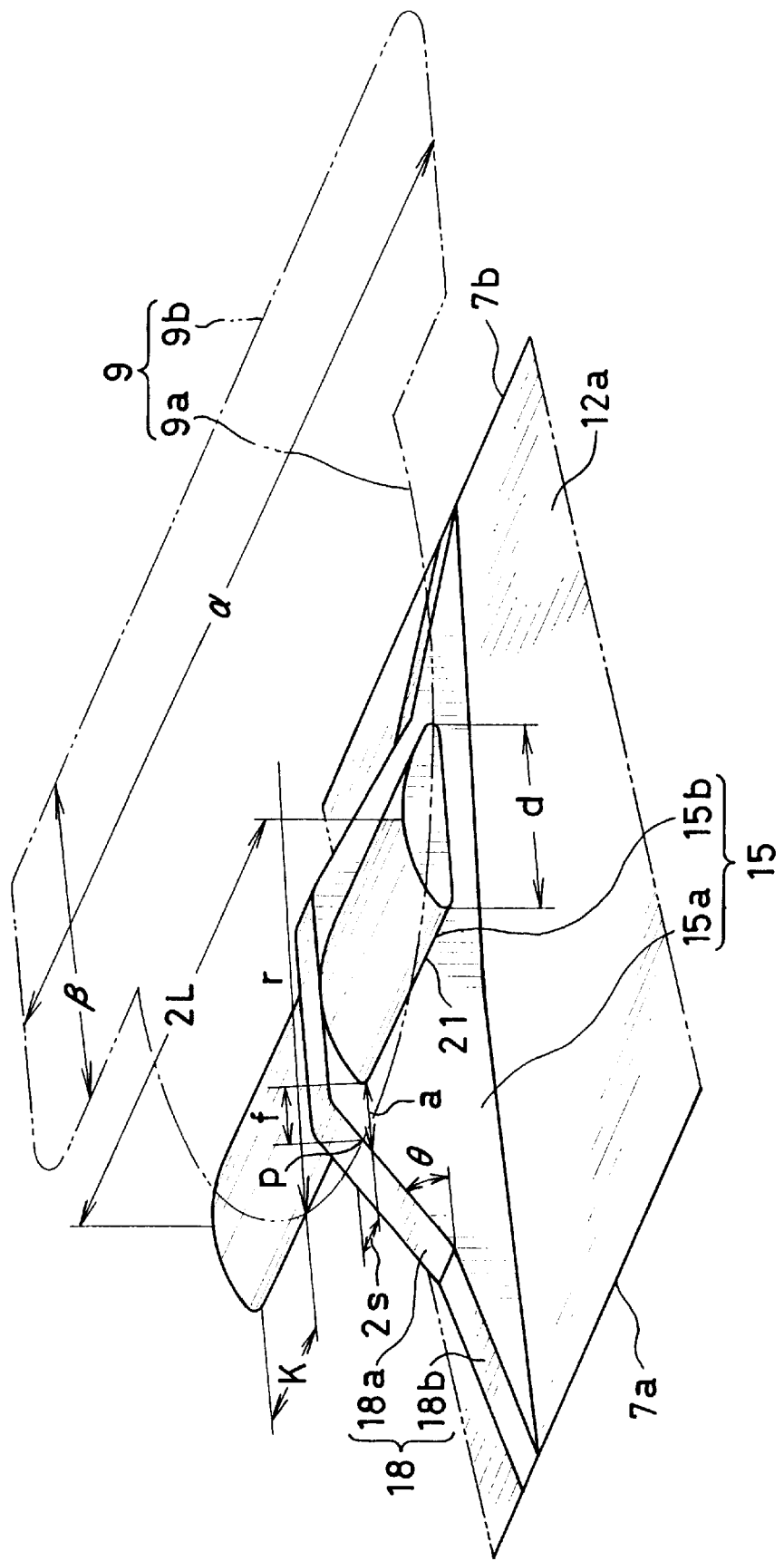
FIG. 4 is a perspective illustrating a retainer claw mechanism and a retainer hole.

In FIG. 4, the erect plate 15a of the retainer claw mechanism 15 has inclined edges 18, which are inclined with two different angles. In the inclined edges 18, there are top edge sides 18a and foot edge sides 18b. Let θ be an angle of the inclination of the top edge sides 18a. If the angle θ should be too great, it is likely that the leader is hindered from advancing at points connected with the foot edge sides 18b. Thus a preferable range of the angle θ is 45° or less. Should the angle θ be too small, reliability in retention on the retainer hole 9 is very low. Thus the preferable range of the angle θ is 30° or more.

In FIG. 4, K represents a retaining amount or a width of the overlapped portion as viewed in the axial direction of the spool, where the edge of the retaining region 9a is overlapped by a corner of lateral claws 15b. Let r be a radius of the retaining region 9a. Let s be a half of a thickness of the erect plate 15a. Let L be a length of each of the lateral claws 15b, or half of the distance between distal ends of the lateral claws 15b. Let f be the distance between a claw edge 21 of the lateral claws 15b and an engaging end P where the edge of the retaining region 9a is engaged with the erect plate 15a. The distance f is expressed by the formula of:

$$f=(r^2-s^2)^{1/2}-\{r^2-(L-K)^2\}^{1/2} \quad \text{Condition 1}$$

In accordance with this equation, the retaining amount K is expressed by the formula of:

$$K=L-\{s^2+2f(r^2-s^2)^{1/2}-f^2\}^{1/2} \quad \text{Condition 2}$$

Figure 4A:
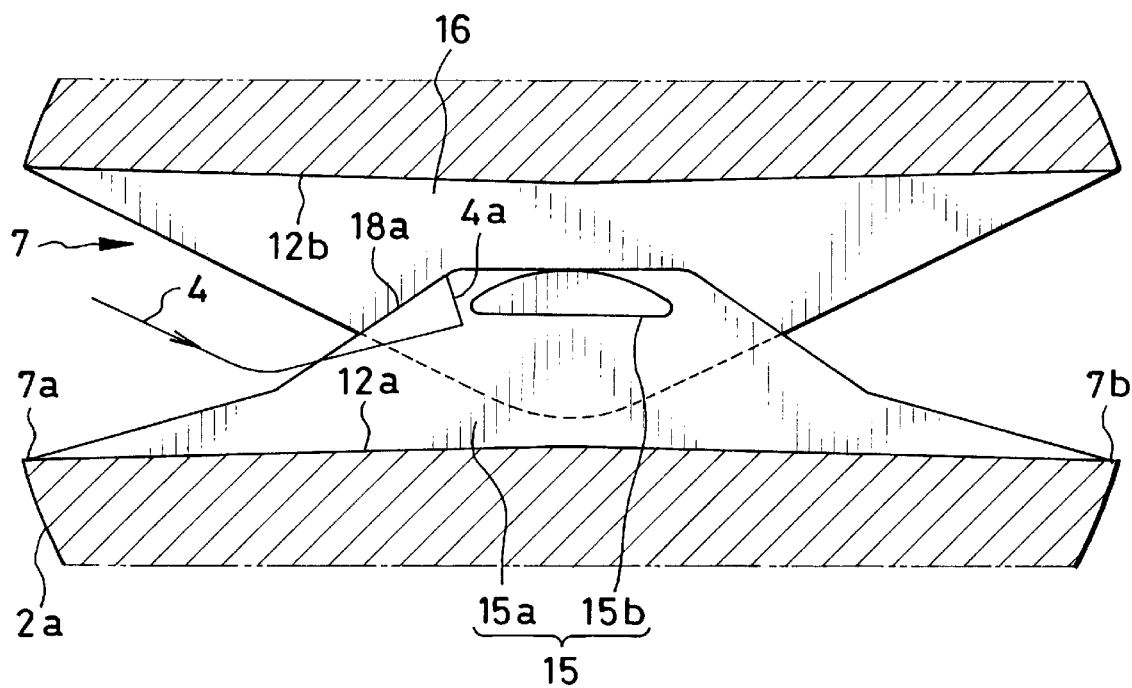
FIG. 4A is a cross section, partially cut away, illustrating the take-up spool and the leader having an arch-shaped curl.
Figure 5:
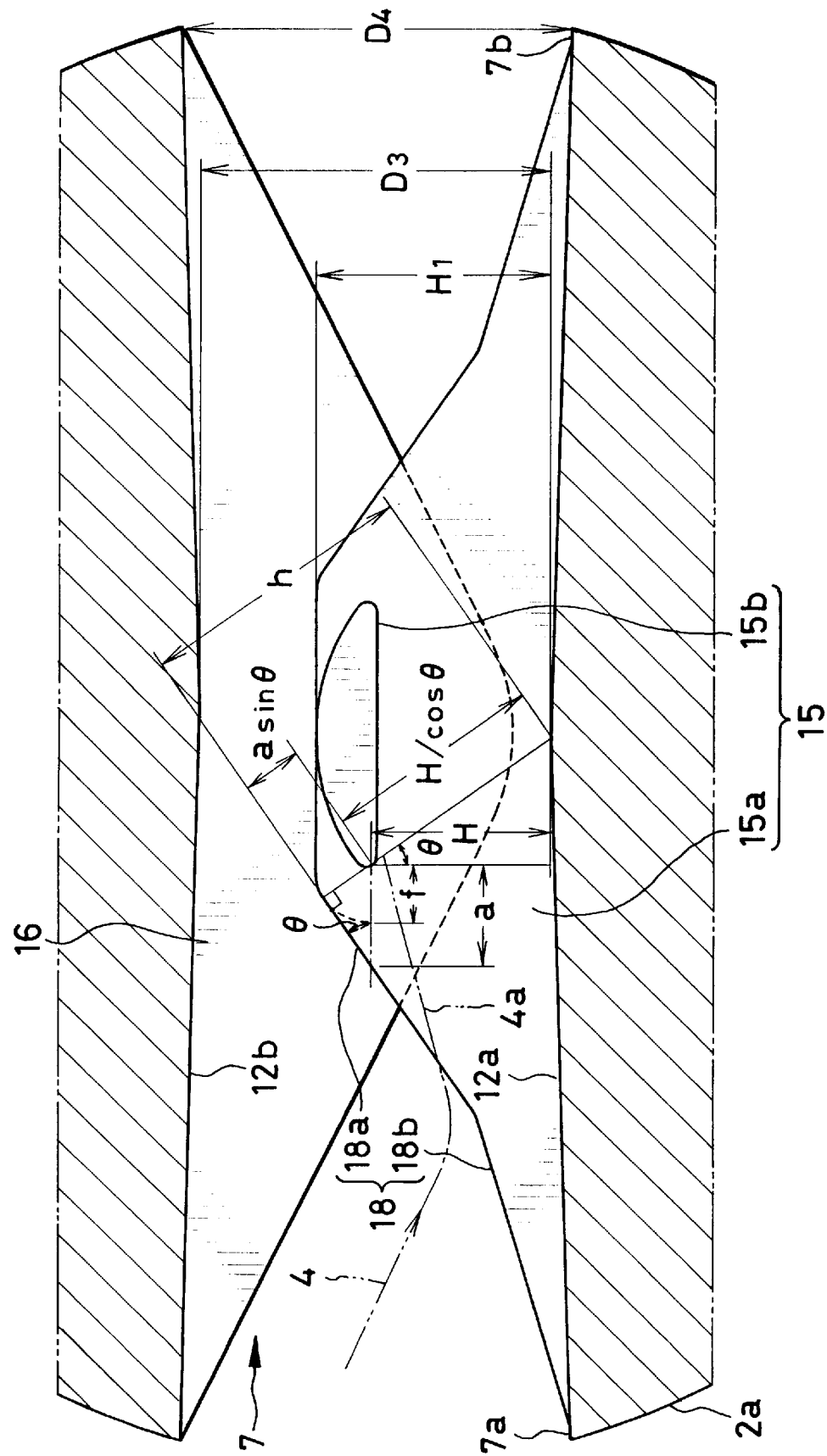
FIG. 5 is a cross section, partially cut away, illustrating of the take-up spool.

In FIGS. 4A and 5, the leader 4a of the backing paper 4 is inserted into the opening 7a of the slit 7. The leader 4a is directed toward the top of the erect plate 15a while contacted by the top edge side 18a of the erect plate 15a. The arch-shaped curl of the leader 4a is likely to cause interference of the edge of the leader 4a with an end of the lateral claws 15b. Let a be a minimum horizontal distance between the claw edge 21 of the lateral claws 15b and the top edge side 18a of the erect plate 15a. A distance between the claw edge 21 and the front edge of the backing paper 4 in contact with the top edge side 18a is expressed as a·sin θ. When the backing paper 4 is engaged with the retainer claw mechanism 15, the edge of the retainer hole 9 is pulled toward the top and slightly deformed, so that the value a·sin θ is regarded as equal to f in the above-indicated formulas. Therefore a·sin θ is substituted for f to obtain the following:

$$K=L-\{s^2+2a\cdot\sin\theta(r^2-s^2)^{1/2}-(a\cdot\sin\theta)^2\}^{1/2} \quad \text{Condition 3}$$

An experiment was conducted for retention between the take-up spool 24 and the backing paper 4 by varying the retaining amount K. It was found that a preferable range of the retaining amount K was K≧0.5 mm in consideration of good retainability. It is desirable that the horizontal distance a, the claw length L, the radius r of the retaining region 9a, the half thickness s and the inclination angle θ should satisfy Condition 3 and K≧0.5 mm. A clearance between a wall 12a and the press ribs 16 should be considerably small. Of course the clearance should be greater than a certain lower limit in view of moldability. In conclusion, a preferable range of the clearance between the wall 12a and the press ribs 16 is 0.25–0.3 mm.

Let d be a width of the lateral claws 15b. Let α be an open width of the releasing region 9b in the width direction of the backing paper 4. Let β be an open width of the releasing region 9b in the longitudinal direction of the backing paper 4. It is preferable that the releasing region 9b dimensionally satisfies conditions of:

2L<α≦6L and d<β<2d in consideration of ease of disengagement of the retainer claw mechanism 15 and intensity of the backing paper 4. Note that corners of the releasing region 9b are rounded for the purpose of avoiding breaking of the backing paper 4 at the releasing region 9b.

The operation of the roll photo film 1 is described now. When a user observes the surface of the spool core 2a of the take-up spool 24, he or she finds the claw indicia 10 to indicate the presence of the retainer claw mechanism 15 in the take-up spool 24. Then he or she inserts the leader 4a of the backing paper 4 into the opening 7a of the slit 7 as indicated by the phantom lines in FIG. 6. Lateral edges of the leader 4a are guided by the press ribs 16 before the leader 4a is positioned in the center of the slit 7.

Figure 7:
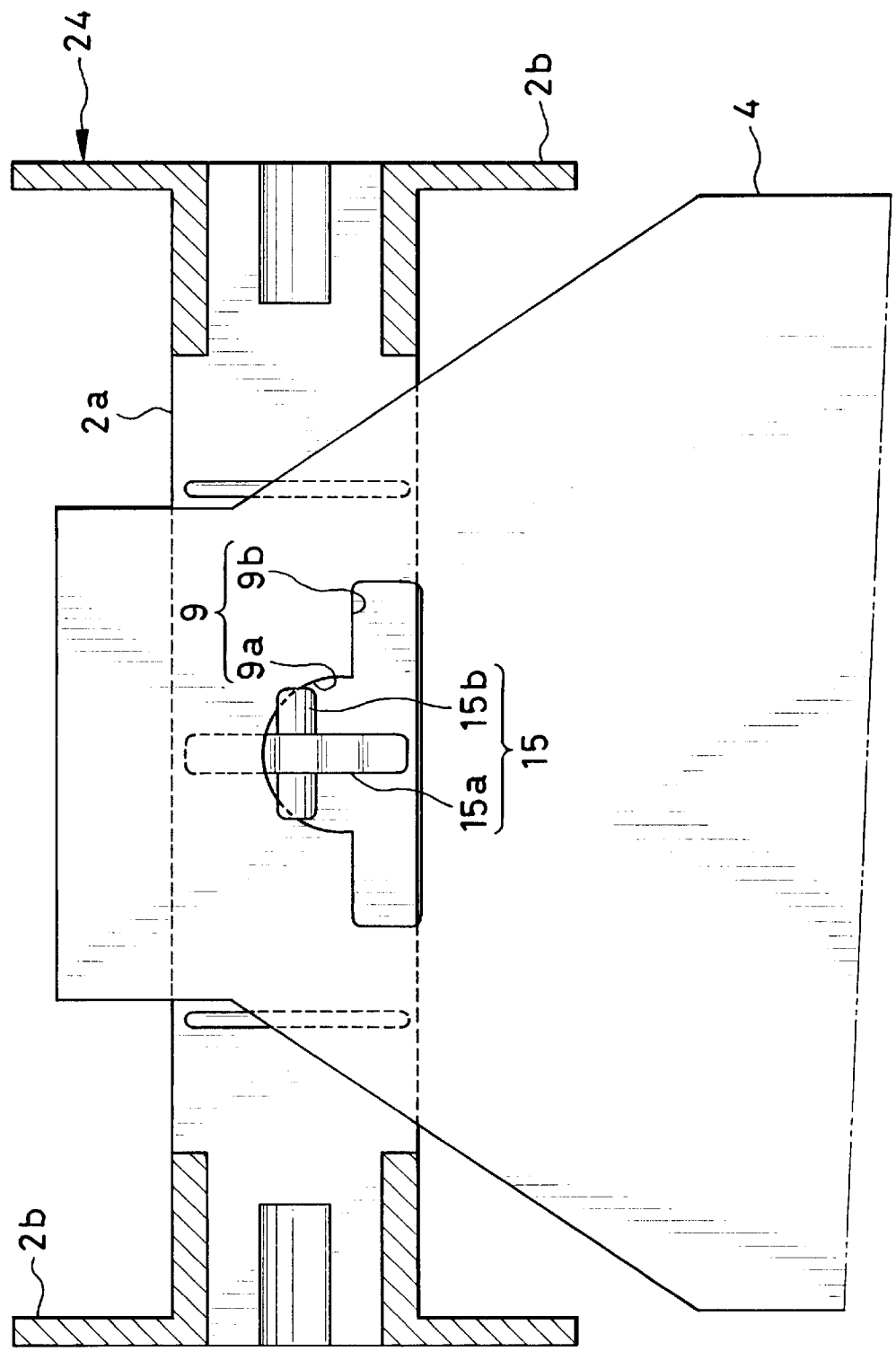
FIG. 7 is an explanatory view in plan illustrating a state where the leader is finally retained on the take-up spool.

When inclined sides 4b and 4c come in contact with the slit 7, the center of the retainer hole 9 coincides with the center of the retainer claw mechanism 15. The whole contour of the lateral claws 15b becomes contained in the retainer hole 9. The backing paper 4 is pressed by the press ribs 16 toward the wall 12a, to drop the top of the retainer claw mechanism 15 into the retainer hole 9. Then the take-up spool 24 is rotated. In FIG. 7, the retainer claw mechanism 15 moves toward the retaining region 9a. Ends of the lateral claws 15b become engaged with the edge of the retaining region 9a, so that the leader 4a of the backing paper 4 is retained on the take-up spool 24.

The take-up spool 24 being rotated continuously, the leader 4a of the backing paper 4 becomes wound about the spool core 2a. The arrow indicia printed on the back surface of the backing paper 4 is positioned at a start mark disposed inside a camera, before a back door of the camera is closed. The user manually operates a wheel of the camera for winding the photo film. A first frame of the photo filmstrip 3 is set on an exposure aperture 34 of FIG. 2A. Also a shutter mechanism is charged to be ready for taking an exposure.

The backing paper 4 is removed from the take-up spool 24 after the roll photo film 1 is unloaded from the camera, either when all exposures are taken on the roll photo film 1, or when the user changes his or her mind and takes out the take-up spool 24 from the camera with all frames unexposed. After all exposures are taken on the roll photo film 1, the roll photo film 1 removed from the camera is developed before the backing paper 4 is removed from the take-up spool 24. In contrast, after taking out the take-up spool 24 from the camera with all frames unexposed, the backing paper 4 is removed from the take-up spool 24 for the purpose of winding the roll photo film 1 in its originally unused state.

Figure 8:
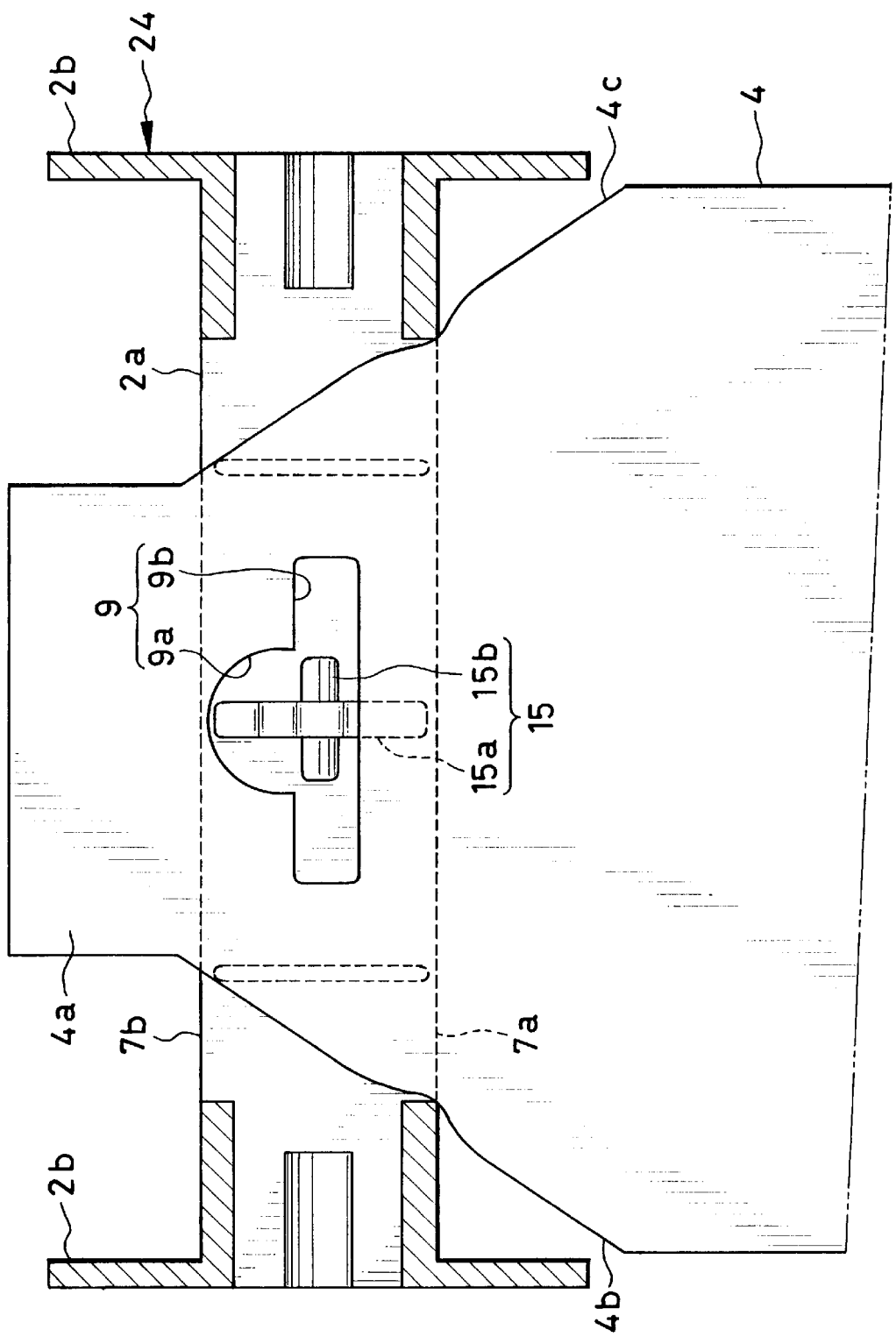
FIG. 8 is an explanatory view in plan illustrating a state during the insertion and where a leader advances to the deepest position.
Figure 9:
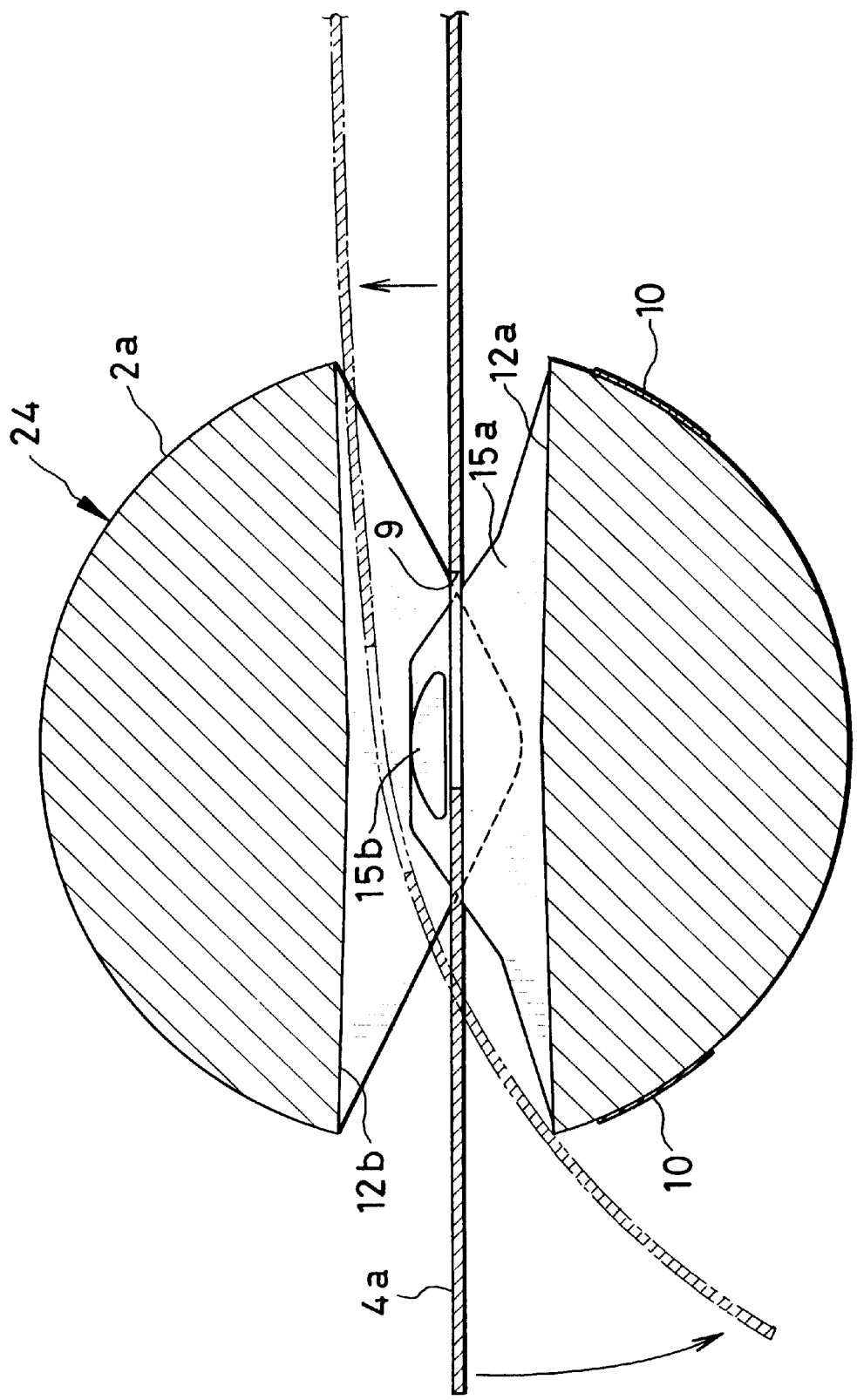
FIG. 9 is a cross section illustrating a state of disengaging the leader from the spool.

To remove the backing paper 4 from the take-up spool 24, the leader 4a of the backing paper 4 is pushed down toward the wall 12a having the retainer claw mechanism 15, or toward the side of the claw indicia 10, and is pulled while pushed down. See FIG. 9. The foot portion of the backing paper 4 is pressed against the wall 12b. In FIG. 8, the lateral claws 15b are moved to the releasing region 9b. The backing paper 4 moves in a direction away from the retainer claw mechanism 15, to disengage the retainer hole 9 from the retainer claw mechanism 15. Note that the inclined sides 4b and 4c are deformed by contact with edges of the take-up spool 24, but only at an amount causing no problem. Then the backing paper 4 is pulled away from the take-up spool 24, and is easily separated from the take-up spool 24.

In the above embodiment the retaining region 9a is nearly semi-circular. Alternatively the retaining region 9a may have a crescent shape either larger or smaller than a semi-circle.

Figure 6:
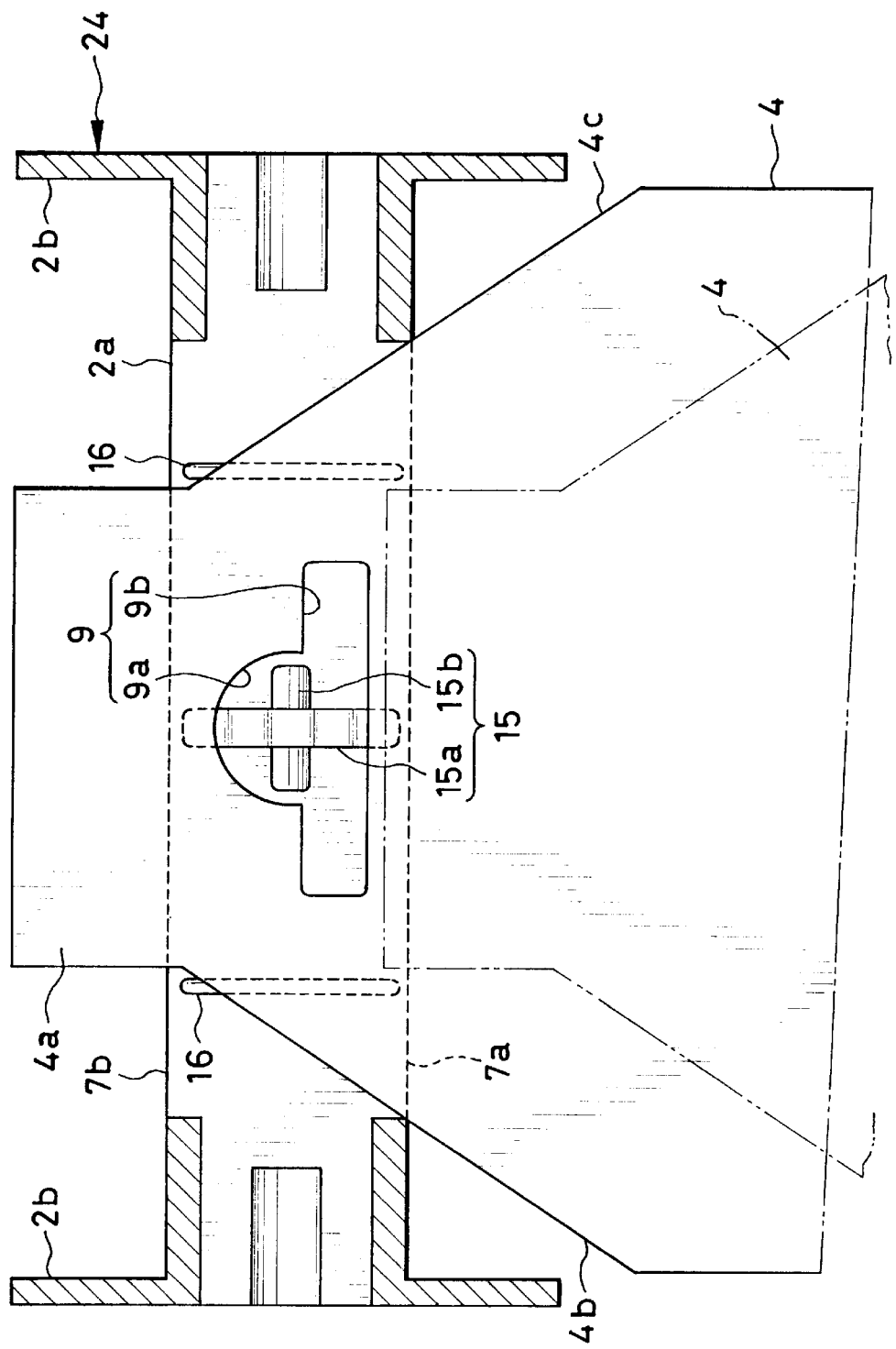
FIG. 6 is an explanatory view in plan illustrating a state shortly before a finish of retention of the leader to the take-up spool.
Figure 10:
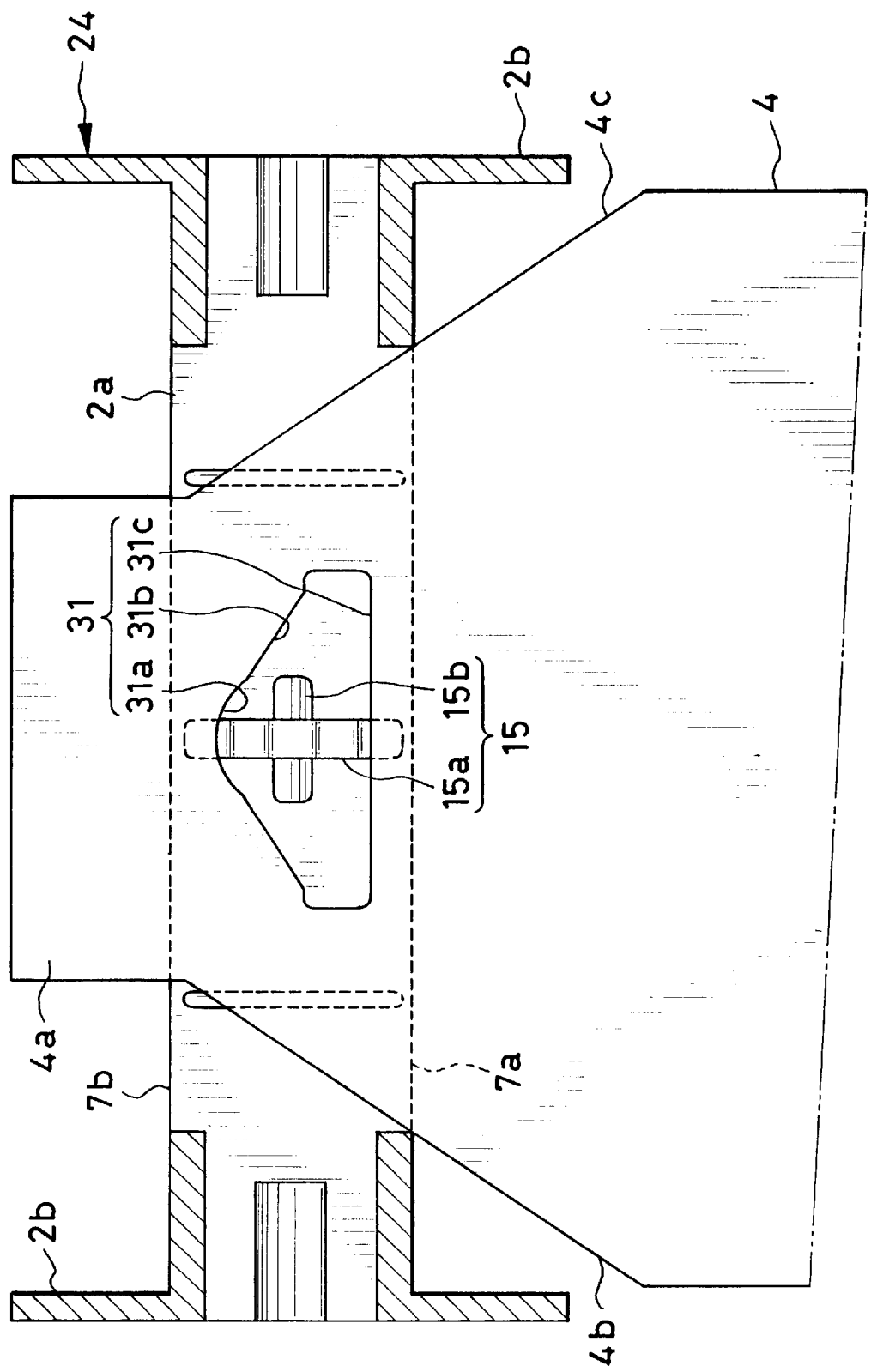
FIG. 10 is an explanatory view in plan illustrating another preferred retainer hole in a leader.
Figure 11:
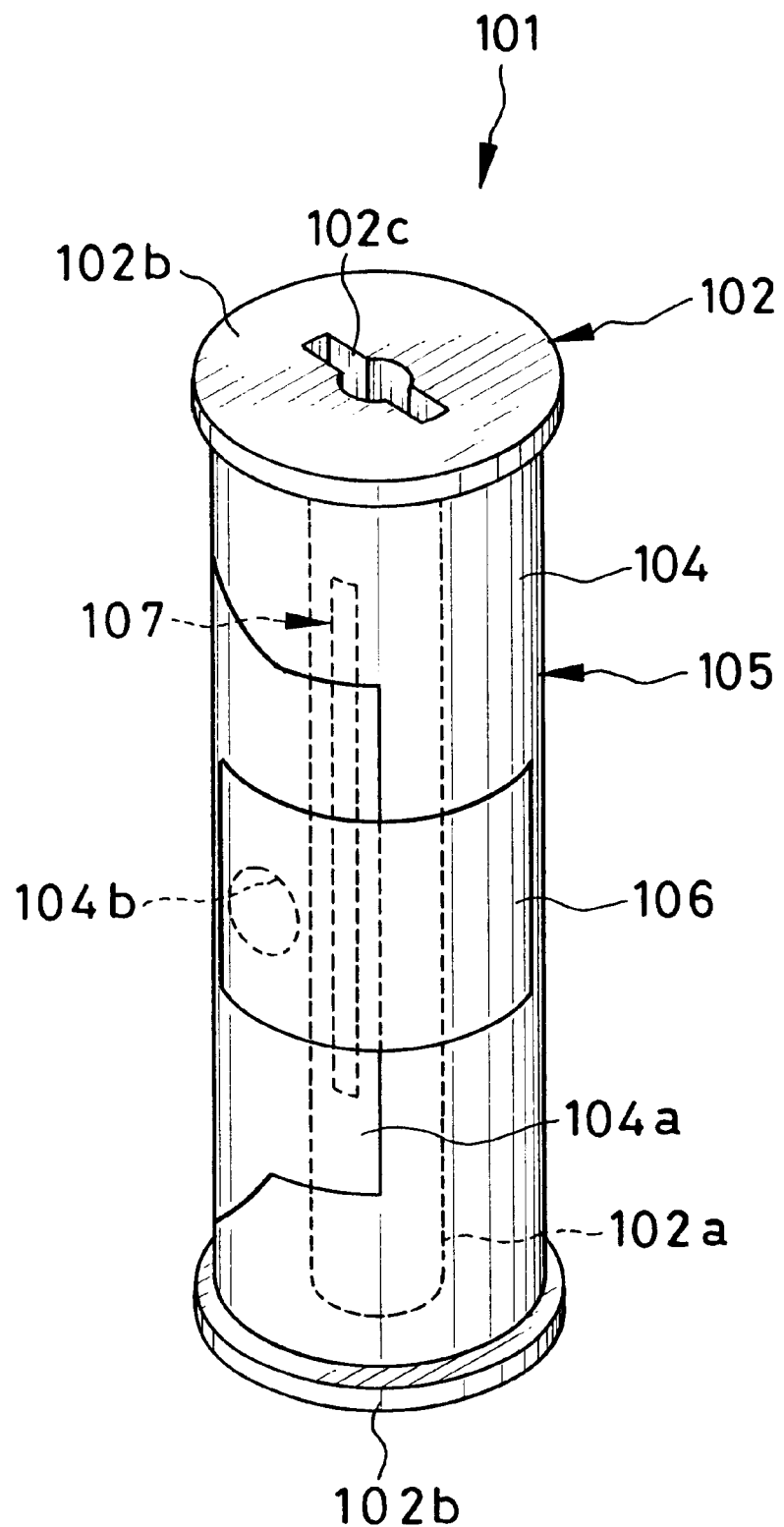
FIG. 11 is a perspective illustrating another preferred roll photo film.

In the present embodiment, the shape of the retainer hole consists in the combination of an arc and rectangular sides of FIG. 6. Alternatively a retainer hole 31 of FIG. 10 may be formed according to the present invention. The retainer hole 31 has an arc-shaped edge 31a, inclined edges 31b and a channel-shaped edge 31c. The arc-shaped edge 31a is located closer to the end of the backing paper 4, and engageable with the lateral claws 15b of the retainer claw mechanism 15. The inclined edges 31b extend from the arc-shaped edge 31a, and have an interval increasing gradually. The channel-shaped edge 31c is combined with the inclined edges 31b to constitute a releasing region larger than the releasing region 9b. The retainer hole 31 has an advantage of the large size of the releasing region, in view of greater ease in the disengagement of the retainer claw mechanism 15.

It is also to be noted that a releasing region of a retainer hole in the present invention may be quadrangular, pentagonal, hexagonal, or polygonal in any suitable manner. Also a releasing region may have a curved edge.

Another preferred embodiment is described with reference to FIGS. 11–21, in which a front edge of a leader connected with the photo filmstrip is prevented from interfering with a retainer claw of a take-up spool in the course of insertion of the leader into a slit of the take-up spool.

In the present embodiment, a leader 104a is left straight without being folded like the leader according to the prior art. The leader 104a has a greater rigidity than that of the prior art, because the leader 104a is not likely to flex typically in the insertion of the leader 104a of backing paper 104 into a slit 107 in a spool core 102a. The force for inserting the leader 104a into the slit 107 can be transmitted to the end of the leader 104a in a reliable manner.

Walls 112a and 112b have loosely inclined faces for the purpose of facilitating receipt of the leader 104a of the backing paper 104, and guiding the leader 104a to the center of the slit 107. See FIG. 5. An interval D3 between the centers of the walls 112a and 112b is for example 2.0 mm. A width D4 of openings 107a and 107b of the slit 107 is for example 2.3 mm. In general a photo film push roller of a camera has a diameter of 2.4 mm. In view of this the width D4 is determined smaller than 2.4 mm to avoid an unwanted drop of such a photo film push roller into the opening 107a or 107b.

Figure 13:
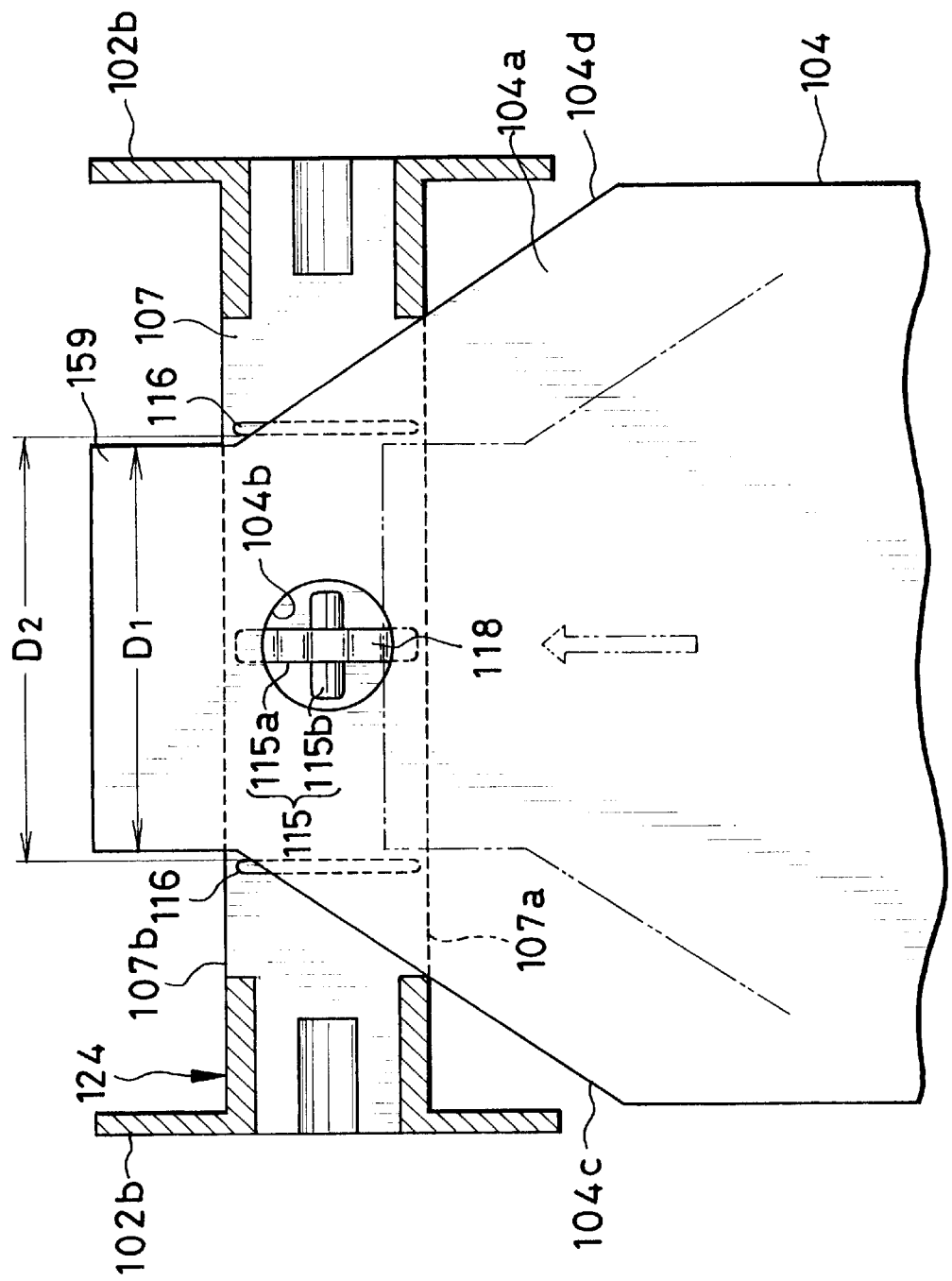
FIG. 13 is an explanatory view in plan illustrating a state shortly before a finish of retention of the leader to the take-up spool.

In FIG. 13, the leader 104a, while inserted into the opening 107a of the slit 107, is guided by press ribs or ridges 116 as indicated by the phantom lines. The center of the backing paper 104 as viewed in its width direction is kept on the center of the slit 107 as viewed in its length direction while the leader 104a is moved toward a retainer claw mechanism 115. The leader 104a is contacted by one of inclined edges 118 of an erect plate 115a, and deformed with an arch-shaped curl by resistance of the inclined edge 118, until the leader 104a passes the top of the erect plate 115a. Note that the arch-shaped curl characteristically derives from a curling tendency of the backing paper 104 curled in the roll form. A roll photo film 101 originally has the roll form of FIG. 11, so that it is impossible to eliminate the arch-shaped curl from the backing paper 104. The curl is likely to cause collision or interference between a front edge of the leader 104a and an edge of lateral claws 115b.

It is also to be noted that the arch-shaped curl also derives from a two-layered structure of the backing paper 104. The backing paper 104 includes a base paper and a resinous layer formed thereon and including light-shielding black material. Those layers are different in their shrinking characteristic, so as to provide the backing paper 104 with a curling tendency.

Figure 14:
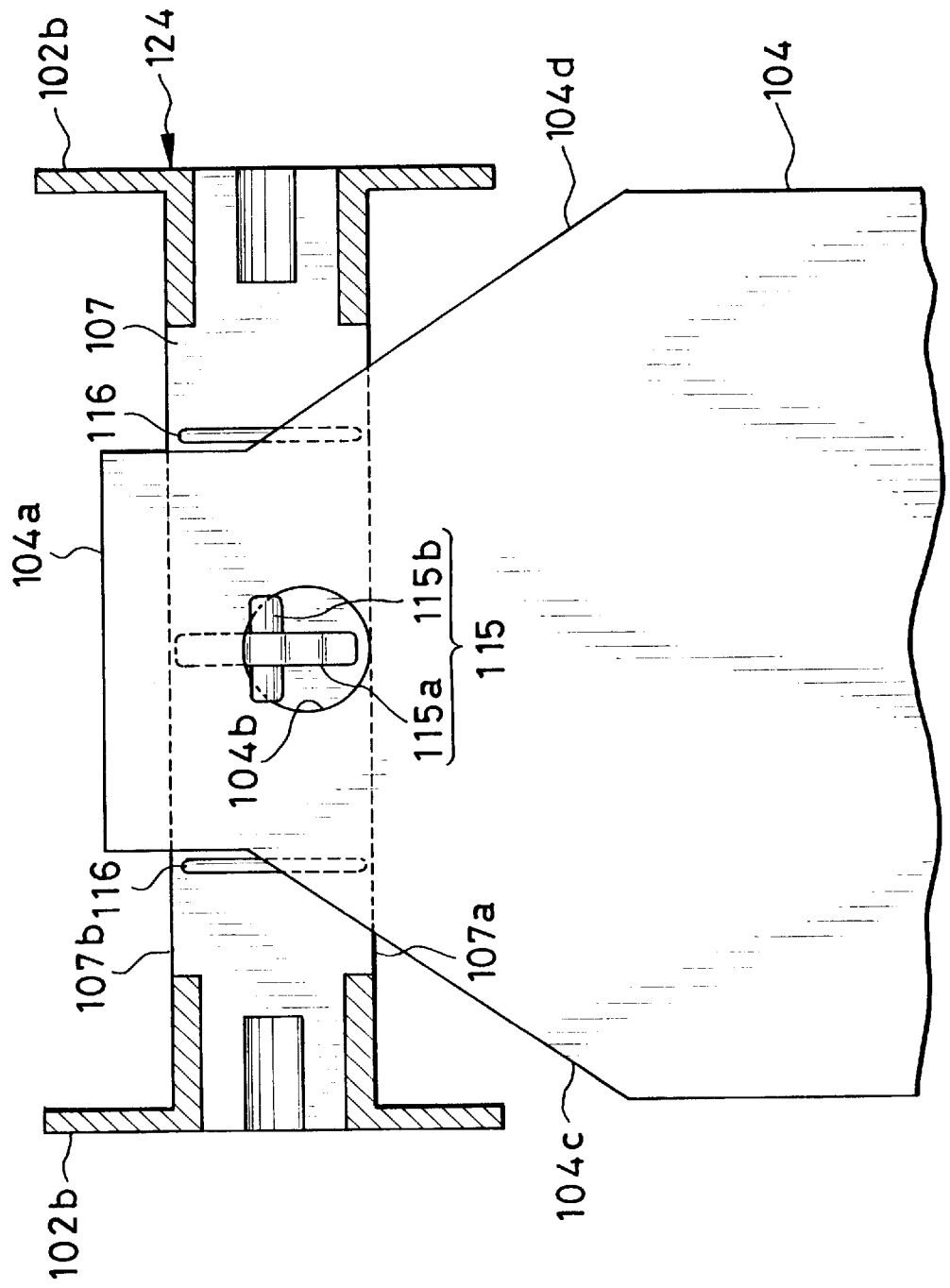
FIG. 14 is an explanatory view in plan illustrating a state where the leader is finally retained on the take-up spool.
Figure 15:
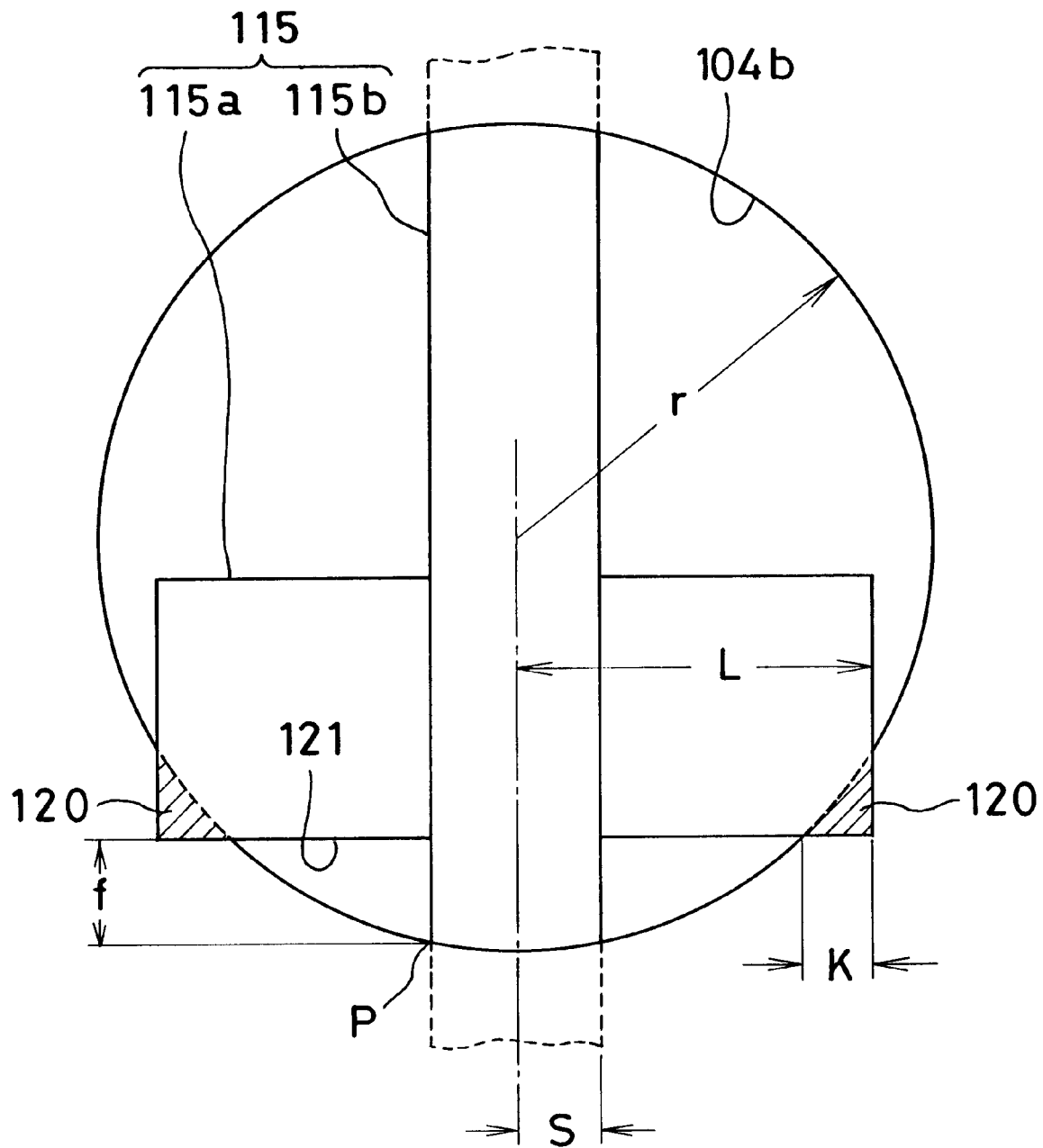
FIG. 15 is an explanatory view in plan illustrating a relative position of lateral claws and a retainer hole retained thereon.

In the course of insertion of the backing paper 104, inclined sides 104c and 104d formed with the leader 104a become pushed by the press ribs 116, so that the backing paper 104 is pressed toward the retainer claw mechanism 115. When the backing paper 104 is moved to a position of setting the center of a retainer hole 104b at the center of the retainer claw mechanism 115, the retainer claw mechanism 115 enters the retainer hole 104b as indicated in the solid lines in the drawing. Thereafter a take-up spool 124 is rotated. The backing paper 104 is pulled in a direction away from the slit 107, and moved toward the wall 112b in contact with one of top edge sides 118a. In FIG. 14, an edge of the retainer hole 104b is captured by corners of the lateral claws 115b, to retain the backing paper 104 on the retainer claw mechanism 115 finally. Note that, if a direction of inserting the leader 104a into the slit 107 is offset from the center of the slit 107 as viewed in the axial direction, the inclined sides 104c and 104d are contacted and regulated by edges of the slit 107, and positioned correctly.

In the present embodiment, the sign r is used to represent a radius of the retainer hole 104b. Conditions 1, 2 and 3 are satisfied even with this change of the definition of r.

Figure 16:
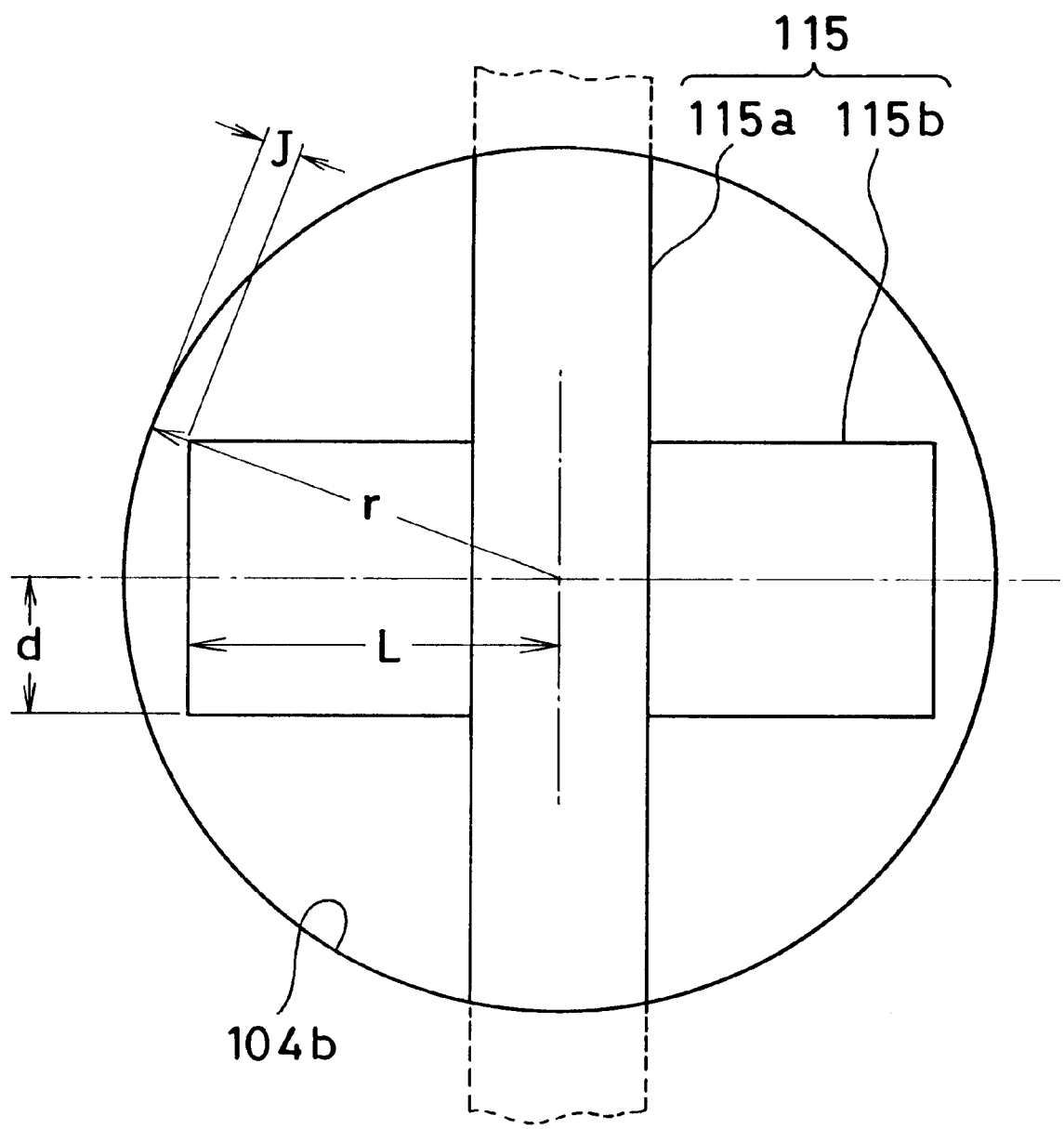
FIG. 16 is an explanatory view in plan illustrating the relative position of the lateral claws and a retainer hole in the state of FIG. 14.

In FIG. 16, the center of the retainer hole 104b is positioned in the center of the retainer claw mechanism 115 in the course of the movement of the backing paper 104. Let d be a half of a width of the lateral claws 115b. Let J be a clearance between the lateral claws 115b and the edge of the retainer hole 104b. The clearance J is preferably equal to or greater than 0.35 mm in view of irregularity in the insertion of the backing paper 104. The clearance J is expressed by the formula of:

$$J = r - (d^2 + L^2)^{1/2} \qquad \text{Condition 4}$$

A preferable range of the radius r of the retainer hole 104b is 3 mm or more in view of easiness in preparing a perforating blade for forming the retainer hole 104b. If dust created by forming the retainer hole 104b has a small diameter, a problem is likely to occur due to the smallness of the dust in that the dust electrostatically sticks to the backing paper 104. Consequently the radius r should be greater than a certain lower limit. If in turn the radius r is too great, the retaining amount K is too small and lowers reliability in the retention between the take-up spool 124 and the backing paper 104. An experiment was conducted in relation to the retaining amount K, so that the retaining amount K was preferably K≧0.5 mm, and desirably K≧0.8 mm. If an increase of the radius r and the retaining amount K is intended at the same time, the length L of the lateral claws 115b must be increased. The arch-shaped curl of the leader 104a will be the more likely to cause interference between the front edge of the leader 104a and the lateral claws 115b. For those reasons, it is preferable that the radius r of the retainer hole 104b is in a range of 2.8 mm≦r≦6.0 mm.

Moreover, a preferable range of the thickness s of the erect plate 115a is 0.5 mm≦r≦0.9 mm in of consideration of various conditions of moldability, such as fluidity of the resin and sink marks.

Figure 17:
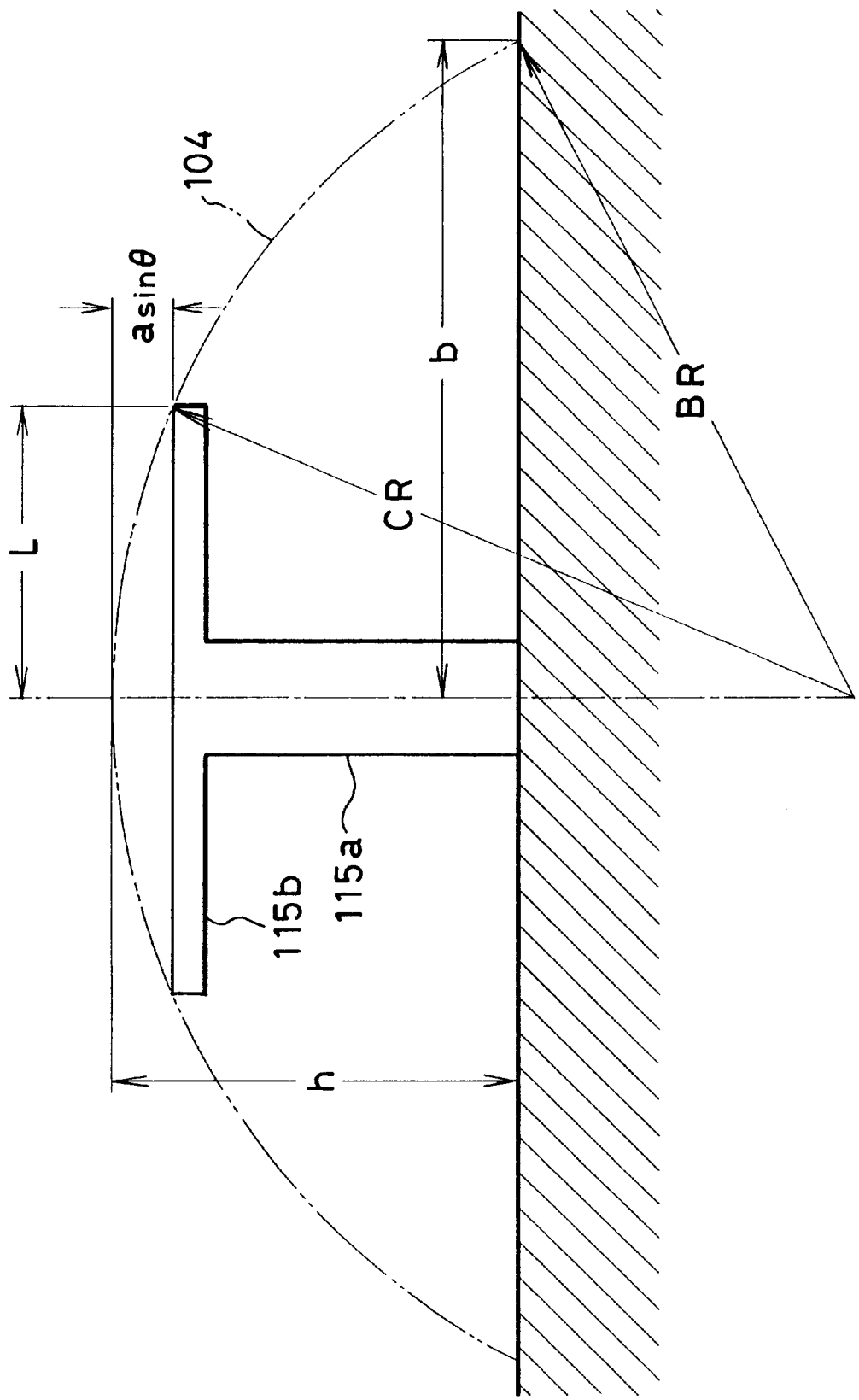
FIG. 17 is an explanatory view in elevation illustrating an erect plate and the lateral claws of the take-up spool.
Figure 18:
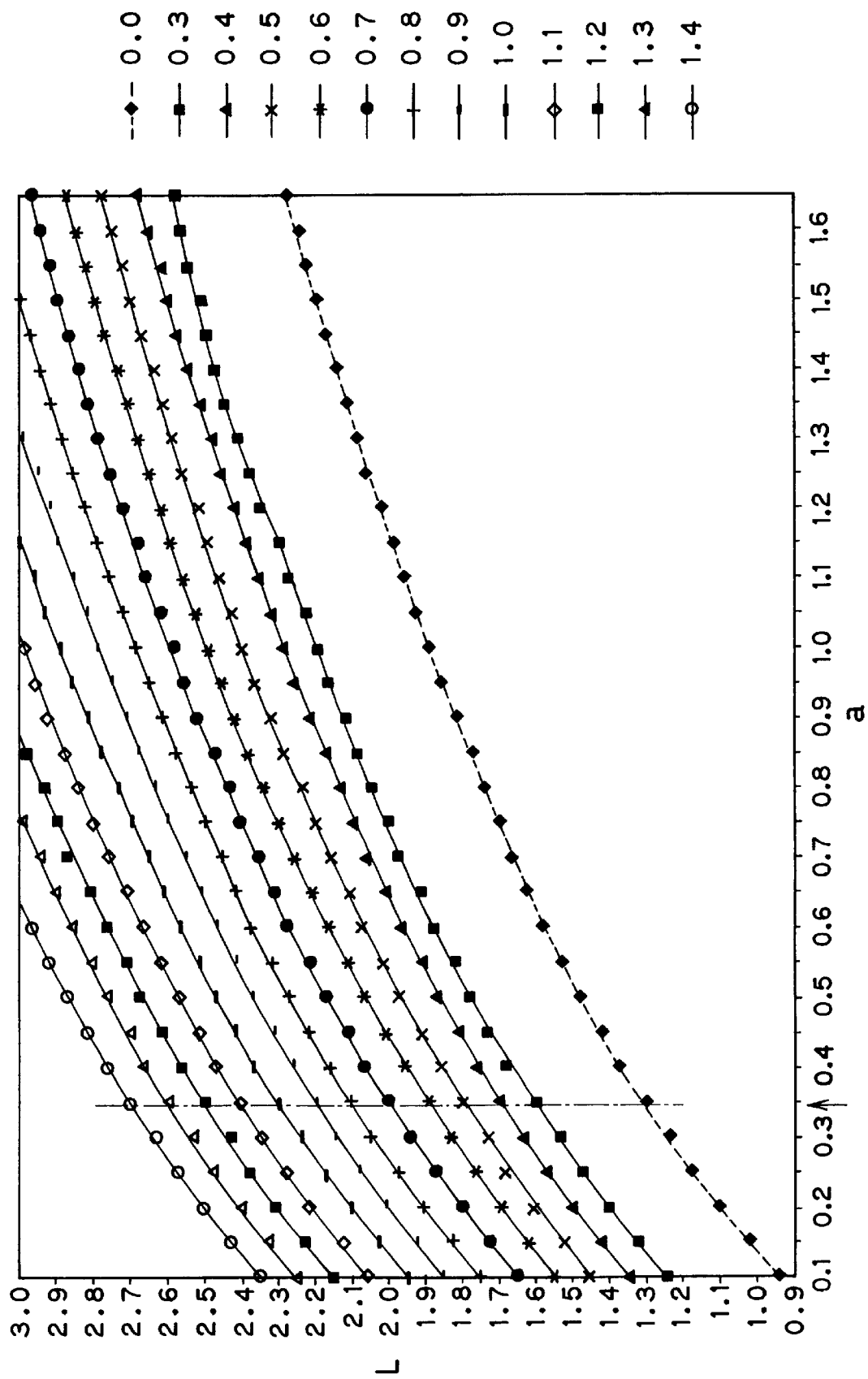
FIG. 18 is a graph illustrating a relationship between a length L of the lateral claws and a minimum horizontal distance a to an inclined edge of the erect plate from the lateral claws, while a constant K or overlapped range of an overlapped portion of the lateral claws is varied.
Figure 19:
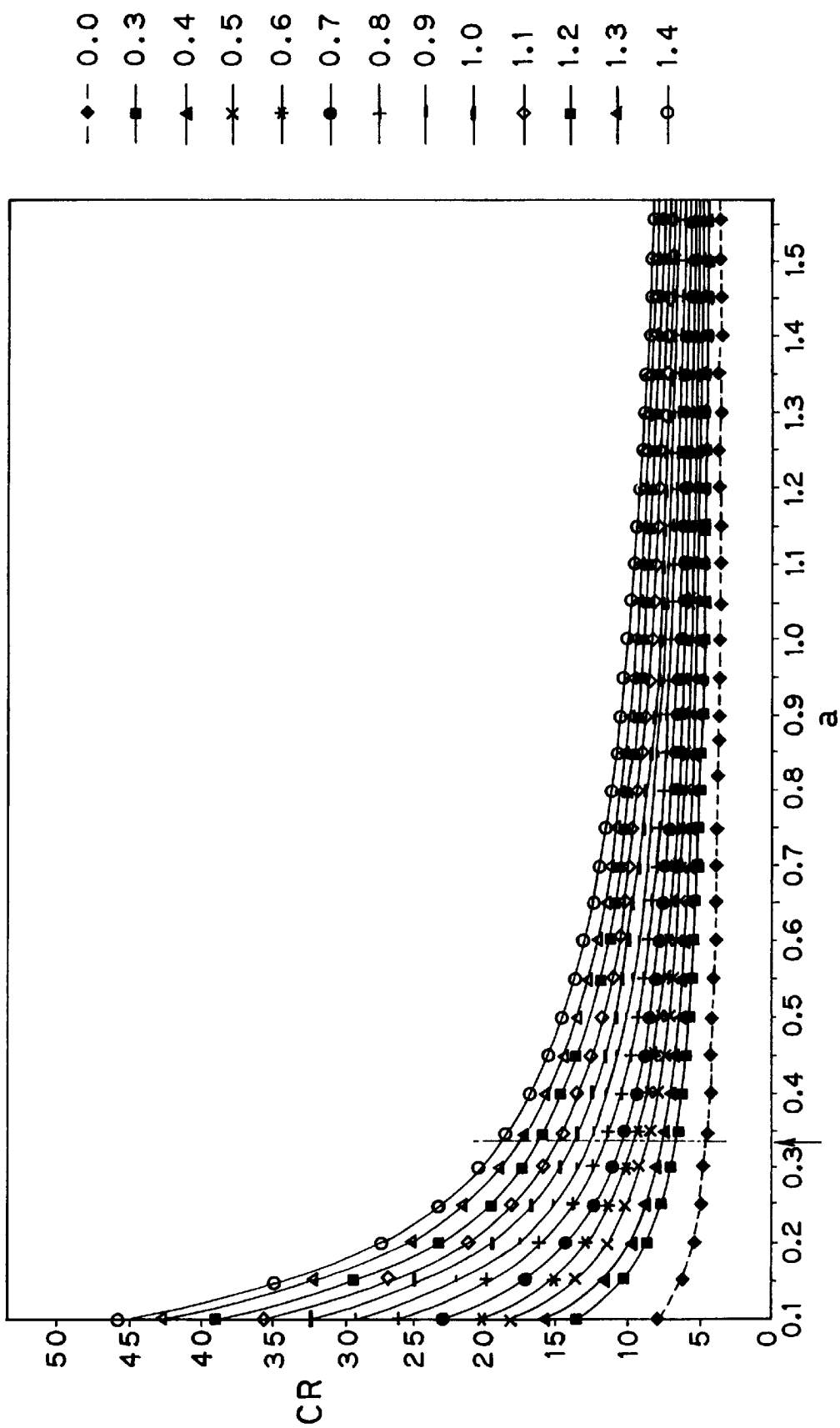
FIG. 19 is a graph illustrating a relationship between the minimum horizontal distance a and a distance CR to an end of the lateral claws from a center of the arch-shaped curl.

The interference of the leader 104a of the backing paper 104 with the retainer claw mechanism 115 is due to the arch-shaped curl of the leader 104a. In FIG. 17, the state of this interference is depicted. Let CR be a distance between the center of the arch-shaped curl and the end of the lateral claws 115b. There is a relationship between the distance CR, the length L of the lateral claws 115b, and a·sin θ, as expressed in the equation below. Note that, in FIG. 17, the retainer claw mechanism 115 is viewed through the opening 107a. The retainer claw mechanism 115 is viewed not in parallel with the walls 112a and 112b, but with an inclination parallel to the inclined edge 118 and from a position closer to the wall 112a.

$$a·\sin θ = CR - (CR^2 - L^2)^{1/2} \quad \text{Condition 5}$$

According to this, CR is expressed by the formula of:

$$CR = \{(a·\sin θ)^2 + L^2\}/(2a·\sin θ) \quad \text{Condition 6}$$

It is apparent the value of CR is uniquely determined by the values of a·sin θ and L. If the curling radius BR is smaller than CR, the leader 104a of the backing paper 104 collides or interferes with the lateral claws 115b. If the curling radius BR is greater, the leader 104a of the backing paper 104 does not. CR is herein referred to as an interference coefficient. A condition of being free from interference between the leader 104a and the lateral claws 115b is expressed by:

$$CR ≦ BR \quad \text{Condition 7}$$

In Condition 3, the retaining amount K can be varied while the values of s, r and θ are kept constant such that s=0.75 mm, r=3 mm and θ=35°. The relationship between L and a under this condition is plotted in a graph of FIG. 18. The conventional claw mechanism has a=0.34, which is indicated by the arrow in FIG. 18. When K is in the range of 0.5 mm≦K≦0.9 mm with a=0.34, then L is found in the range of 1.8 mm≦L≦2.2 mm. With those values determined as such, Condition 6 is plotted in a graph of FIG. 19. Again the value a=0.34 is indicated by the arrow in FIG. 19. When K is in the range of 0.5 mm≦K≦0.9 mm with a=0.34, then CR is found in the range of 8 mm≦CR≦12 mm.

Figure 20:
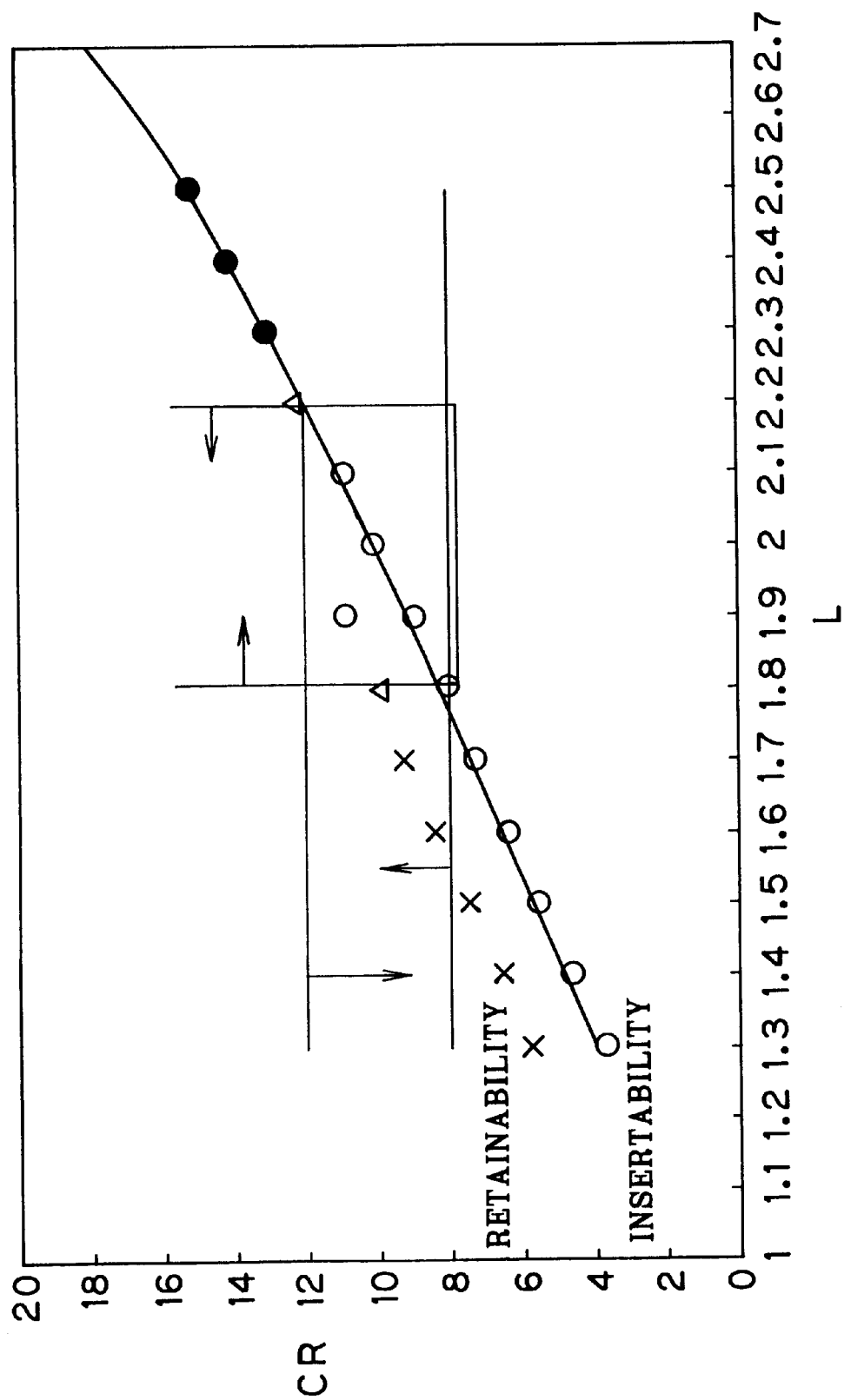
FIG. 20 is a graph illustrating a relationship between the claw length L and the minimum horizontal distance a together with evaluation of insertability and retainability.

Experiments were conducted to observe insertability and retainability of the retainer claw mechanism 115 by varying CR and L, to obtain results of FIG. 20. To indicate grades of insertability in the graph, a circular indicia "o" represents an excellent condition without any interference between the leader 104a and the lateral claws 115b. A triangular indicia "Δ" represents a fair condition with occasional interference between the leader 104a and the lateral claws 115b. A dot indicia "108" represents a failing condition with inevitable interference between the leader 104a and the lateral claws 115b. To indicate grades of retainability in the graph, a circular indicia "o" represents an excellent condition with reliability in retention of the retainer hole 104b on the retainer claw mechanism 115. A triangular indicia "Δ" represents a fair condition with instability in retention of the retainer hole 104b on the retainer claw mechanism 115. A cross indicia "x" represents a failing condition with failure in retention of the retainer hole 104b on the retainer claw mechanism 115. In conclusion, a range of CR effective for good insertability was CR≦12 mm. Ranges of CR and L effective for both of good insertability and good retainability were 8 mm≦CR≦12 mm and 1.8 mm≦L≦2.2 mm.

Let H be a height of the arch-shaped curl of the backing paper 104 with reference to the center of the wall 112a of the lateral claws 115b. See FIG. 5. Let b be a distance between the center of the spool core 102a and the position where the wall 112a is contacted by a lateral end of the backing paper 104 with the curl. The radius BR of the arch-shaped curl of the backing paper 104 is expressed by the following formula:

$$BR = (BR^2 - b^2)^{1/2} + a·\sin θ + H/\cos θ \quad \text{Condition 8}$$

According to this, the radius BR of the arch-shaped curl of the backing paper 104 is expressed by the formula of:

$$BR = \{b^2 + (a·\sin θ + H/\cos θ)^2\}/\{2(a·\sin θ + H/\cos θ)\} \quad \text{Condition 9}$$

If the backing paper 104 has a lower rigidity than experimental data, then BR=12 mm. Assuming that a=0.34 mm, θ=35° and H=1.45 mm, then $b^2$=43.30 mm$^2$. Now it is estimated that the value b is approximately unchanged even when the curling height h=a·sin θ+H/cos θ changes in a range of 0.8 mm≦H≦1.45 mm. The value $b^2$=43.30 mm$^2$ is substituted for the term in Condition 9, to obtain Condition 10 below. Note that the more rigid the backing paper 104, the smaller the value $b^2$.

$$BR = \{43.30 + (a·\sin θ + H/\cos θ)^2\}/\{2(a·\sin θ + H/\cos θ)\} \quad \text{Condition 10}$$

If Condition 7 is satisfied, the leader 104a of the backing paper 104 does not interfere with the lateral claws 115b. Consequently, $$\{(a·\sin θ)^2 + L^2\}/(2a·\sin θ) ≦ \{43.30 + (a·\sin θ + H/\cos θ)^2\}/\{2(a·\sin θ + H/\cos θ)\} \quad \text{Condition 11}$$

With Condition 11 rewritten, the following is obtained.

$$L ≦ [\{43.30 + (a·\sin θ + H/\cos θ)^2\}a·\sin θ/(a·\sin θ + H/\cos θ) - (a·\sin θ)^2]^{1/2} \quad \text{Condition 12}$$

Figure 21:
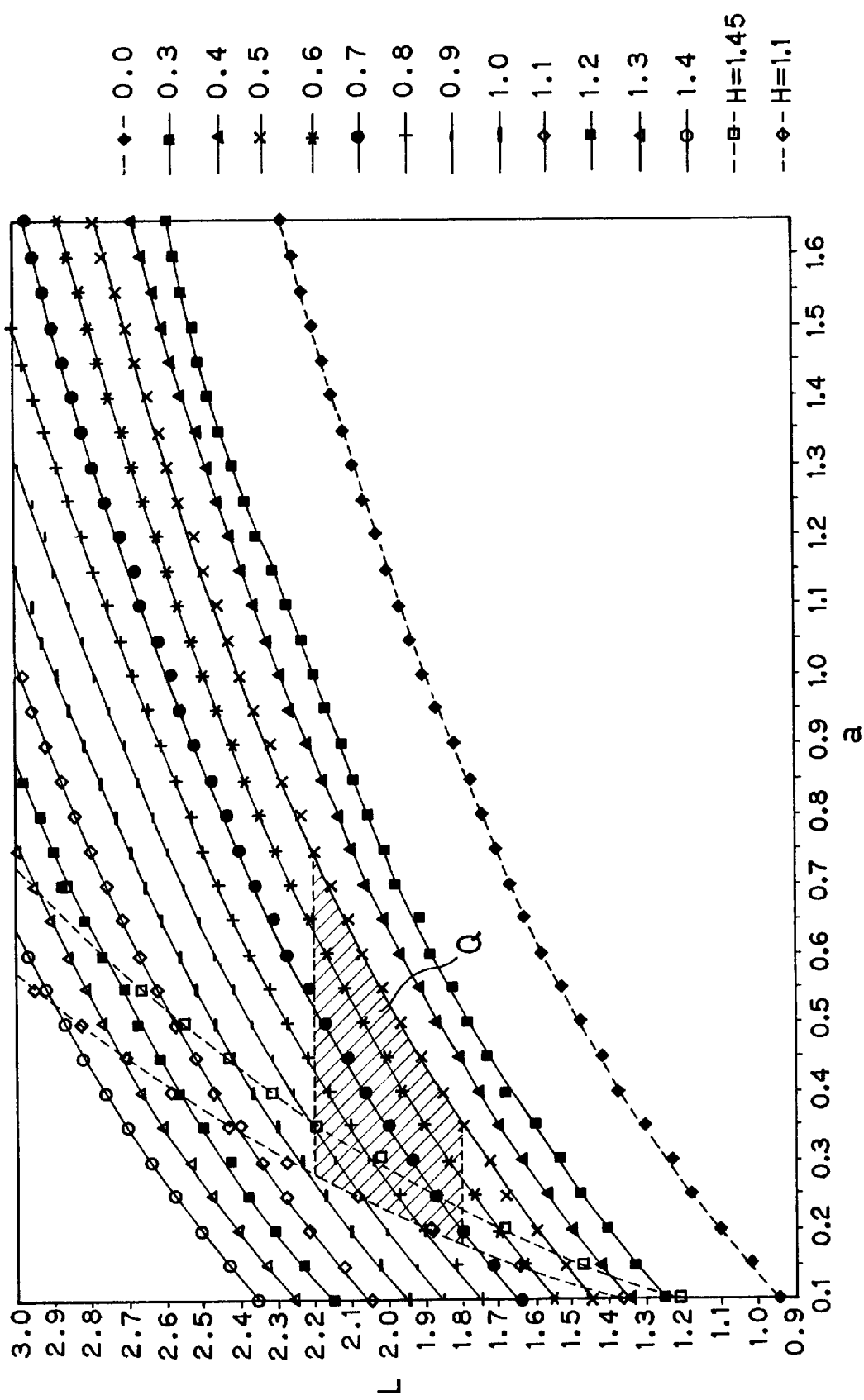
FIG. 21 is a graph illustrating a relationship between a length L of the lateral claws and a minimum horizontal distance a to an inclined edge of the erect plate from the lateral claws, while a constant H or curled height of the arch-shaped curl is varied, together with the curves of FIG. 18.

The relationship between L and a in Condition 3 with constant values of s=0.75 mm, r=3 mm and θ=35° is plotted in a graph of FIG. 21. Also a relationship between L and a in Condition 12 with constant values of H=1.1 mm and 1.45 mm is plotted in FIG. 21. A range Q is hatched, and defined by conditions of 1.8 mm≦L≦2.2 mm and K≧0.5 mm, to constitute an optimum range of dimensions of the retainer claw mechanism 115. If the value H is determined to be 0.85 mm or less, the retainer claw mechanism 115 provides higher insert-ability of the backing paper 104 into the slit 107, but lower retainability because of the insufficient height of the retainer claw mechanism 115. Consequently a preferable range of H is 0.85 mm≦H≦1.45 mm. In consideration of D3=2 mm and the thickness of the lateral claws 115b, a height H1 of the retainer claw mechanism 115 is preferably 1.3–1.75 mm.

A preferable height of the press ribs 116 should be so determined such that a clearance between the wall 112a and the press ribs 116 is considerably small. Of course the clearance should be greater than a certain lower limit in view of moldability. In conclusion, a preferable range of the clearance between the wall 112a and the press ribs 116 is 0.25–0.3 mm.

Reference numeral 102 designates a supply spool, 102b flanges, 102c a key way, 103 a photo filmstrip, 105 paper-backed photo film of 120 type, 106 adhesive tape, 108 connective tape, 118*b* foot edge sides, 120 an overlapped portion, and 121 a claw edge.

The operation of the roll photo film 101 is described now. If the black surface of the backing paper 104 is directed to the wall 112*a* before insertion of the leader 104*a* into the opening 107*a*, the leader 104*a* is oriented downwards due to the curling tendency of the backing paper 104. The leader 104*a* comes in contact with the inclined edge 118 of the erect plate 115*a*, and then moves while contacted by the inclined edge 118 toward the top, in an arch-shaped curl. The values L, θ and a related to the lateral claws 115*b*, the erect plate 115*a* and the top edge sides 118*a* are determined in ranges to keep the distance CR as interference coefficient equal to or less than the radius BR of the arch-shaped curl. Accordingly there occurs no interference of the front edge of the leader 104*a* with the lateral claws 115*b*. The leader 104*a* safely moves over the top of the retainer claw mechanism 115.

In FIG. 13, the inclined sides 104*c* and 104*d* come in contact with inside edges of the slit 107. The center of the retainer hole 104*b* coincides with the center of the retainer claw mechanism 115. The contour of the lateral claws 115*b* enters the inside of the retainer hole 104*b*. Also the backing paper 104 is pushed by the press ribs 116 toward the wall 112*a*. The top of the retainer claw mechanism 115 drops in the retainer hole 104*b*. Then the take-up spool 124 is rotated, to move the backing paper 104 relatively in a direction away from the slit 107. The edge of the retainer hole 104*b* moves in contact with one of the top edge sides 118*a* of the erect plate 115*a*. In FIG. 14, lateral ends of the lateral claws 115*b* become engaged with the edge of the retainer hole 104*b*, to retain the leader 104*a* of the backing paper 104 on the take-up spool 124.

Now the description is made in relation to a state where an initial rotational orientation of the spool core 102*a* is different from that of FIG. 5 by a phase difference of 180 degrees. When the leader 104*a* is inserted into the opening 107*a* straight, the leader 104*a* is directed toward the wall 112*b* having the press ribs 116. The curl of the leader 104*a* follows the inclined edge 118. The leader 104*a* passes over the top of the retainer claw mechanism 115 without receiving significant resistance from the retainer claw mechanism 115. In contrast, the leader 104*a* may be inserted into the opening 107*a* with an inclination to direct the leader 104*a* toward the foot of the retainer claw mechanism 115. Then the leader 104*a* receives a great resistance from the inclined edge 118 of the erect plate 115*a* to obtain an arch-shaped curl. However the interference coefficient CR of the retainer claw mechanism 115 is equal to or smaller than the radius BR of the arch-shaped curl. There is no interference between the leader 104*a* and the lateral claws 115*b*, so that the leader 104*a* safely passes over the retainer claw mechanism 115.

After the front edge of the leader 104*a* passes over the top of the retainer claw mechanism 115, the black surface of the backing paper 104 is pushed by the press ribs 116. As the backing paper 104 is pushed in a direction against the arch-shaped curl, resistance to the insertion is greater than that at the time of the push of the printed surface. However the resistance to the insertion is negligible, and too small to consider. The leader 104*a* can be inserted without error. When the insertion is finished, the backing paper 104 is retained on the retainer claw mechanism 115.

Note that, according to the above embodiment, the leading edge of the leader is straight, but may be curved in an arc shape.

Figure 12:
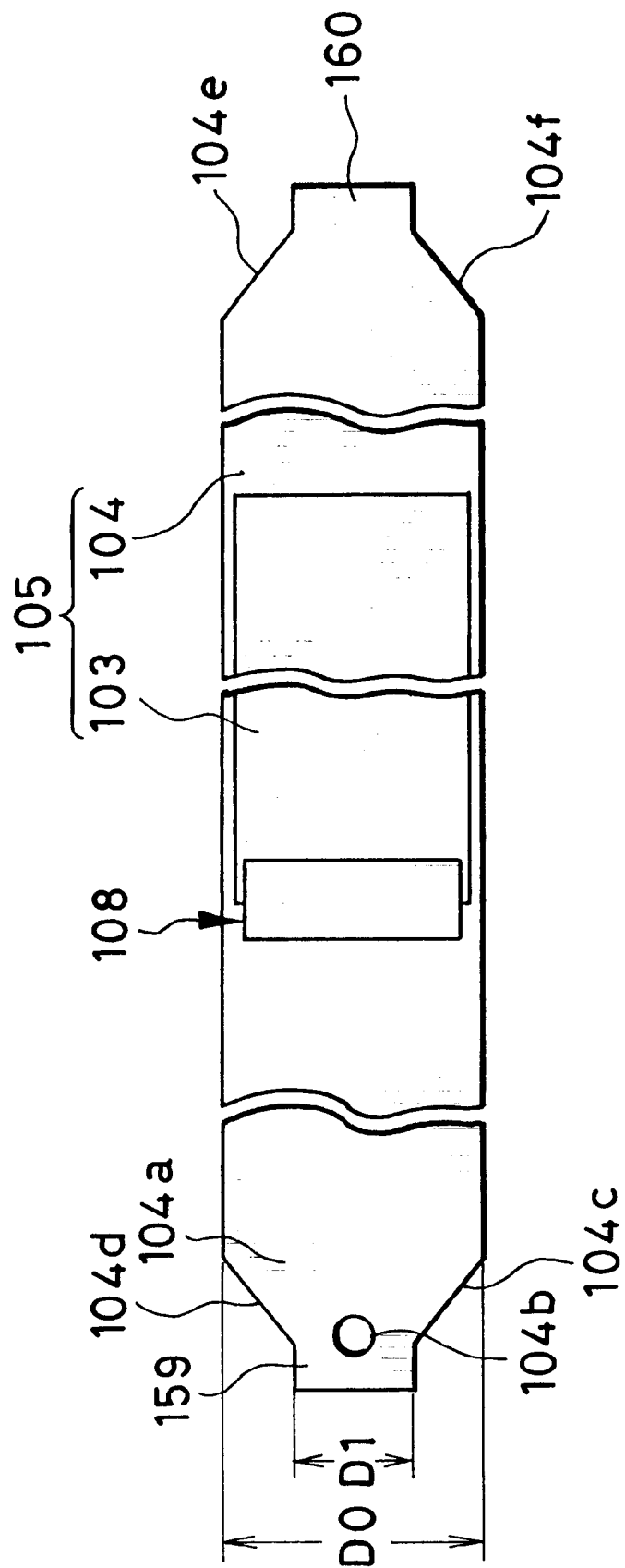
FIG. 12 is a plan, partially broken, illustrating a paper-backed photo film of the roll photo film.

It is also to be noted that, in the above embodiment, $b^2=43.30$ mm$^2$ because of BR=12 mm. However a leader having BR=10 or 11 mm can be considered in determining $b^2$. Consequently $b^2$ may be 35.5 or 39.5 mm$^2$ instead of 43.30 mm$^2$. Referring to FIGS. 11–17, narrowness of distal ends of the leader and the trailer is described. The leader 104*a* of the backing paper 104 and the trailer are formed in a partially narrow manner for the purpose of facilitating insertion into the slit 107 in the take-up spool 124. For example lateral sides of the distal ends of them are cut off respectively at a width of 10 mm toward the center, to form narrowed portions 159 and 160 as illustrated in FIG. 12. Foot points of the narrowed portions 159 and 160 opposite to their distal ends are connected with the inclined sides 104*c* and 104*d* and inclined sides 104*e* and 104*f* toward the originally wider portion of the backing paper 104. In the present embodiment, a width D0 of the backing paper 104 is for example 60 mm. The width D1 of the narrowed portion 160 is for example 11–23 mm, preferably 20 mm. In the center of the foot position of the narrowed portion 159, the retainer hole 104*b* is formed for engagement with a retainer claw mechanism of the take-up spool 124.

An experiment was conducted with plural kinds of backing paper or leader of available Brownie photo film. Longitudinal loop rigidity of those kinds was measured, to classify them for high, low and middle rigidity. The width D1 of the narrowed portion of the backing paper or leader was varied. Insertability of those kinds into the slit in the spool core was evaluated, to obtain results of FIGS. 22–30. Type Nos. 1–3 were used which were different in values of the distance a and the height H. The length L of the lateral claws was varied in a range of 1.3–2.5 mm by 0.1 mm. To indicate grades of insertability, a sign 0 represents an excellent condition without collision or interference between the end of the narrowed portion 159 and the lateral claws 115*b*. A sign Δ represents a fair condition with occurrence of 50% of interference between the end of the narrowed portion 159 and the lateral claws 115*b*. A sign X represents a failing condition with inevitable interference between the end of the narrowed portion 159 and the lateral claws 115*b*. When the interference occurred at a rate between 50 and 100%, O-Δ is indicated. When the interference occurred at a rate between 50 and 0%, Δ-X is indicated.

In the experiment, the longitudinal loop rigidity was defined as a stress measured in the following manner. The backing paper which is 60 mm wide was used, and rounded longitudinally to form a loop being 10 mm across. The loop was compressed by 2 mm, and then was caused to return by 1 mm. During the return a stress in the paper was measured in the longitudinal direction. The Paper A with the high rigidity was derived from Neo Pan SS Brownie photo film (trade name, manufactured by Fuji Photo Film Co., Ltd.). The Paper B with the low rigidity was derived from Professional 160 NS (trade name, manufactured by Fuji Photo Film Co., Ltd.). The Paper C with the middle rigidity was derived from Professional NS (trade name, manufactured by Fuji Photo Film Co., Ltd.) for six (6) exposures. The rigidity was measured for five (5) times respectively for the three types. Paper A had the rigidity of 382.8 g/mm. Paper B had the rigidity of 161.6 g/mm. Paper C had the rigidity of 211.2 g/mm.

As observed in FIGS. 22–30, the insertability was good in regions of combinations of the length L and the width D1 under the double line or in the left of the double line. In conclusion, Paper A and C, which have the longitudinal loop rigidity of 200–400 g/mm with the width of 60 mm, can preferably have the width D1 of the narrowed portion 159 in the range of 11–23 mm for the purpose of increasing the insertability.

In operation of the roll photo film 101, in the insertion of the narrowed portion 159 of the backing paper 104 into the opening 107a of the slit 107, the light-shielding black surface of the backing paper 104 is directed to the wall 112a. The curling tendency of the backing paper 104 orients the narrowed portion 159 downwards. The narrowed portion 159 initially comes in contact with the inclined edge 118 of the erect plate 115a, and moves on the inclined edge 118 toward the top while being curled laterally with the arch-shaped curl. The backing paper 104, however is constituted by Paper A having the longitudinal loop rigidity of 200–400 g/mm with the width D0 of 60 mm. The width D1 is 20 mm. Consequently the radius BR of the arch-shaped curl of the narrowed portion 159 is sufficiently great for avoiding interference of the end of the narrowed portion 159 with the lateral claws 115b. The narrowed portion 159 is enabled to pass the top of the retainer claw mechanism 115.

The base paper for the backing paper or leader of the roll photo film of the invention may be any of those which are made mainly from natural pulps, or from a mixture of natural pulps and synthetic fibers or pulps at an appropriate mixture ratio. It is also possible to make the base paper from pulps mixed with reprocessed pulps or waste paper, or to use multi-layered paper consisting of reprocessed pulp layers or waste paper layers and natural pulp layers.

Preferable natural pulps are kraft pulps of conifer trees, broadleaf trees, or mixture thereof. As natural pulps for use with kraft pulps, sulfide pulps are preferable, but high-yield pulps such as SCP, CGP, TMP, RGP are applicable.

Various additive agents may be loaded in the base paper during adjustment of slurry of paper materials. It is particularly preferable to load some of the following agents:

Sizing agents: fatty acid metal salt and/or fatty acid, alkyl-ketene dimer emulsion or epoxy higher fatty acid amide that is disclosed in JP-B 62-7534, alkenyl or alkyl-succinic acid anhydrous emulsion, and rosin derivative;

Dry paper reinforcer: anion, cation or ampholytic polyacryl amide, polyvinyl alcohol, cationic starch (e.g. JP-A 3-171042), and vegetable galacto mannan;

Wet paper reinforcer: polyamine-polyamide and epichlorohydrin resin;

Filler: clay, kaolin, calcium carbonate, titanium oxide etc.;

Bonding agents: water-soluble aluminum salt such as aluminum chloride and a sulfate salt of alumina;

pH adjuster: caustic soda, sodium carbonate, sulfuric acid etc.; and

Coloring pigment, coloring dye and/or fluorescent brightener such as disclosed in JP-A 63-204251 and JP-A 1-266537.

The base paper may further contain various additive agents such as water-soluble polymer, latex, emulsion and anti-static agents by coating, spraying, tab sizing, size press or other methods.

As water-soluble polymer, there are starch polymer that is disclosed in JP-A 1-266537, polyvinyl alcohol polymer, gelatin polymer, polyacrylamide polymer, cellulose polymer. As anti-static agents, there are conductive materials including non-ionic surface active agent such as polyoxyethylene glycol, cation surface active agent such as quaternary ammonium salt, ampholytic surface active agent, alkyl amine derivative, fatty acid derivative, several kinds of lubricant, carbon black, graphite, metallic surface coating pigment, metallic powder, metallic flake, carbon fiber, metallic fiber, whisker (potassium titanate, alumina nitride, and alumina). As concrete components, there are alkaline metal salt such as sodium chloride and potassium chloride, alkaline earth metal salt such as calcium chloride and barium chloride, colloid metallic acid such as colloid silica, and organic anti-static agent such as polystyrene sulphonate.

As latex or emulsion, there are petroleum resin emulsion, and latex such as styrene-acrylic acid-acrylic ester copolymer, styrene-acrylic acid-butadiene copolymer, ethylene-vinyl acetate copolymer, and styrene-maleic acid-acrylic ester copolymer. As pigment, there are clay, kaolin, talc, barium sulfate, titanium oxide. As pH adjuster, there are hydrochloric acid, phosphoric acid, citric acid and caustic soda.

The base paper may have a complete light-shielding property by itself, or a light-shielding layer may be additionally formed on the base paper by post-treatment. In either case, the base paper may be a black paper to supplement the light-shielding effect. The black paper preferably contains 1–15 wt. % furnace carbon black having an average particle diameter of 15–80 m$\mu$ and 0.1–10 wt. % synthetic zeolite having an average particle diameter of 0.1–5 m$\mu$. The base paper may further contain 0.01–5 wt. % cationic water-soluble polymer and 0.1–2 wt. % cationic black or blue dye (dye whose coloring portion carries positive electric charge, such as diallyl methane, triallyl methane, thiazole, methine, xanthene, oxazine, thiazine, azo, and anthraquinone).

The base paper is made from the paper material slurry having addition of the additive agents according to an appropriate paper making method such as disclosed in JP-A 58-37642, JP-A 61-260240 and JP-A 61-284762, by use of a conventional paper machine such as a wire paper machine or a cylinder paper machine, so as to obtain equal formation. The paper material thereafter is subjected to calendaring by use of machine calender, super calender or thermal calender, to have a weight of 50–100 g/m$^2$, preferably 60–90 g/m$^2$, and a thickness of 45–120 $\mu$m, preferably 60–100 $\mu$m. Regarding physical properties, it is preferable that the base paper has a smoothness of 90 seconds or more, preferably 120 seconds or more in the Beck smoothness that is defined in JIS P-8119 so that the photographic film may not suffer scratches, pressure fogging or other damage from unevenness of the paper surface, and that the gap between the photographic film and the backing paper or leader may be minimized to improve light-shielding properties and moisture barrier properties. The base paper preferably has an air permeability of 500 seconds or more when measured according to JIS P-8117, and a sizing degree of 10 seconds or more in Stöckigt sizing degree (JIS P-8122) in view of after-processing, or to give a sufficient water- and moisture-resistance to the backing paper or leader.

For the present invention, tensile strength at break of the hole of the backing paper or leader in relation to the claw of the spool is an important factor. Since it is desirable that the load applied during the photo film winding is about 200 g to 300 g to draw the photo film, and that retaining force is 500 g or more. Therefore, the base paper preferably has a tensile strength of 4.5 Kgf/15 mm or more in the longitudinal direction (JIS P-8113) and a tearing strength of 35 gf or more (JIS P-8116).

As thermoplastic resins for forming the light-shielding layer on the rear surface of the base paper, those disclosed in U.S. Pat. Nos. 2,646,365, 2,646,366, 2,751,309, and 2,959,492, FR-1449852, JP-B 51-49205, JP-A 48-22020, JP-A 50-67644, JP-A 55-140835, JP-A 58-17434, JP-A 58-186744, JP-A 59-68238, JP-A 60-35728, JP-A 6-51450 etc. are applicable. That is, one of polyolefin resin such as several kinds of low, middle and high-density polyethylene, and linear low-density polyethylene and polypropylene; polyvinyl resin such as ethylene vinyl acetate; acrylic resin such as ethylene ethyl acrylate and ethylene methyl acrylate; rubber resin such as styrene butadiene; homopolymer such as ionomer; graft copolymer polyamide resin; and polyester resin such as polyethylene terephthalate. Thermoplastic resins may be any of the homopolymers, or a blend or copolymer of two or more of the polymers. It is also possible to form more than one resin layer overlaid on the rear surface of the base paper.

Preferable examples of the light-shielding material added to the resin are carbon black, titanium nitride and graphite as light-absorbing light screen materials having superior light-shielding properties. Among these, carbon black is preferable in view of light-shielding properties, cost and physical properties. Furnace carbon black is well-known and preferable, but channel carbon black or thermal carbon black is also applicable. Acetylene carbon black and Ketchen carbon black being a denatured by-product, are preferable because of their light-shielding properties as well as anti-static properties.

Considering the use in the backing paper or leader for photographic film, carbon blacks are required to have smaller unfavorable effect on the photographic film, such as fogging and disordering of photo film sensitivities, but provide sufficient light-shielding effect. In this point of view, preferred furnace carbon blacks have pH 6.0–9.0, and an average particle diameter from 10–120 m$\mu$, more preferably from 15–100 m$\mu$, and most preferably from 20–80 m$\mu$, a volatile content of 2.0% or less, more preferably 1.0% or less, and most preferably 0.5% or less, and an oil-absorption factor of 50 ml/100 g or more, more preferably 70 ml/100 g or more, and most preferably 100 ml/100 g or more, because they are not apt to provide pin holes, hard spots or fish-eyes in resin film or coat, and improve light-shielding properties and dispersing properties, only with smaller adverse affect to photographic properties and physical properties.

Representative examples of preferred carbon blacks on the market include Carbon Black #20(B), #30(B), #33(B), #40(B), #41(B), #44(B), #45(B), #50, #55, #100, #600, #2200(B), #2400(B), MA8, MA11 and MA100, all produced by Mitsubishi Kasei Corporation; Black Pearls 2, 46, 70, 71, 74, 80, 81 and 607, Regal 300, 330, 400, 660, 991 and SRF-S, Vulcan 3 and 6, Sterling 10, SO, V, S, FT-FF and MT-FF, all produced by Cabot Co., Ltd.; and Uniteel R, BB, 15, 102, 3001, 3004, 3006, 3007, 3008, 3009, 3011, 3012, XC-3016, XC3017 and 3020, all produced by Ashland Chemical Co. However, the carbon black is by no means limited to these examples.

There are mainly three methods of forming on the base paper a resin layer containing 4–30 wt. % light-shielding material as above.

A first one of them is coating and drying a liquid of the resin dispersed or solved in an organic solvent or water. The liquid may be coated by reverse roll coating, blade coating, air knife coating, rod coating, flood coating, curtain coating, extrusion coating, gravure coating, or any other appropriate coating method. According to this method, the thickness of the consequent dried resin coat is appropriately 1–25 $\mu$m.

A second one of the methods is hot-melt coating of the resin. Extrusion coating is typical, but any other method is applicable. According to this method, the thickness of the consequent dried resin coat is appropriately 5–60 $\mu$m.

The third method is forming a uniform resin film of 20–40 $\mu$m by inflation, T-die, casting, or rolling, and then cementing the resin film to the base paper by dry lamination with a polyurethane or polyether adhesive at a thickness of 1–3 g/m$^2$. Any of the above methods is applicable to the backing paper or leader of the present invention.

The ink for use in printing information such as the bar code and decorative patterns on the backing paper or leader may be selected from among widely used inks having no harmful influence on photographic materials.

Representative examples of appropriate synthetic resins for ink are vinyl chloride/vinyl acetate resin copolymer; nitrate pyroxylin, polyester; polyamide urethane; polyacryl; rosin denatured maleic acid; ethylene-vinyl acetate; vinyl ether; urethane-vinyl acetate; vinyl acetate-urethane resin; modified alkyd resin, modified phenol resin; alkaline soluble resin including rosin modified maleic acid resin, styrene maleic acid resin, styrene acrylic acid resin, acrylic ester acrylic acid resin, and methacrylic ester acrylic acid resin; hydrosol-type resin including styrene maleic acid resin, styrene acrylic acid resin, $\alpha$-methyl styrene acrylic acid resin, acrylic ester acrylic acid resin, and methacrylic ester acrylic acid resin; emulsion-type resin including styrene resin, styrene acrylic ester resin, acrylic ester copolymer resin and methacrylic ester copolymer resin. As resins for ultraviolet (UV) ink, polymers with acrylic unsaturated groups are usual. Representative examples are polyester/acrylic ester, polyester/urethane resin/acrylic ester, epoxy resin/acrylic ester, pentaerythritol triacrylate, trimethylol propane triacrylate, hexane diol diacrylate, neopentyl glycol diacrylate, triethylene glycol diacrylate, and hydroxy ethyl methacrylate.

These inks are used with well-known colorant. Examples of these colorants are several kinds of pigments disclosed in JP-A 63-44653 and so forth:

Azo-pigments: azo lake such as carmine 2B, red 2B; insoluble azo such as monoazo yellow (PY-1, -3), disazo yellow (PY-12, -13, -14, -17, -83), pyrazolone orange (PO-B34), Balkan orange (PO-16); overall azo types such as chromophthal yellow (PY-93, -95), chromophthal red (PR-144, -166);

Polycyclic pigments: phthalocyanine types such as copper phthalocyanine blue (PB-15, -15-1, -15-3), copper phthalocyanine green (PG-7); dioxazine types such as dioxazine violet (PV-23); isoindolinone types such as isoindolinone yellow (PY-109, -110); durene types such as pellilene, perinone, flavanthrone, thioindigo;

Lake pigments such as malachite green, rhodamine B, rhodamine G, Victoria blue B;

Inorganic pigments: oxide such as titanium dioxide, red iron oxide; sulfate such as sedimentary barium sulfate; carbonate such as sedimentary calcium carbonate; silicate such as hydrous silicate, anhydrous silicate; metal powder such as aluminum powder, bronze powder, zinc powder, and carbon black, chrome yellow, iron blue etc.

These pigments are applicable as light-shielding materials for the above-described resin or the paper layer. In addition, oil-soluble dye and dispersing dye are applicable. The ink may further contain several kinds of solvents, dispersing agents, wetting agents, anti-foaming agents, leveling agents, tackifier, stabilizer, cross-linking agents, wax, drier.

It is possible to coat the backing paper or leader with a protection layer called a lacquer coat or varnish for surface glossing as well as for protection of the printed area. As the protection layer, an appropriate one or more of various resins are applicable, including acrylic resin, cellulose resin such as acetate fibrous material, urethane resin, epoxy resin, polyester resin, ionomer resin, EEA resin, various polyethylene resin including low-density, high-density and linear low-density polyethylene, polypropylene resin etc. Wax is also applicable.

For the spool of the roll photo film according to the invention, polystyrene resin is generally used because of its strength, heat-resistant properties, dimensional stability and appearance. Also a blend of general polystyrene resin (GPPS) and high impact or middle impact polystyrene resin (HIPS or MIPS) which is made by polymerizing styrene monomer with a synthetic rubber such as butadiene rubber is preferable. Moreover HIPS or MIPS alone, or a blend of GPPS with a rubber is applicable. The blend of HIPS and GPPS, or MIPS alone is specially preferable in view of impact strength and wearing resistance.

A preferable addition of the rubber is 0.5–6.0 wt. % in consideration of the price, physical strength, injection moldability, surface strength (resistance against scratch and wearing) and appearance. If the rubber addition is below 0.5 wt. %, the sufficient physical and surface strength cannot be obtained. If the rubber addition is above 6.0 wt. %, injection moldability, stiffness, appearance and price are unacceptable for practical use.

For polymerization, any of the following three methods well-known today is applicable: bulk polymerization wherein the monomer is polymerized without any solvent and dispersing agents disclosed in JP-A 64-91136; random bulk polymerization as generally industrialized wherein the monomer, catalyst and a small amount of solvent are used; and suspension polymerization wherein the monomer is dispersed in a medium such as water in which the monomer is not soluble or slightly soluble, and a polymerization initiator is used that is hardly soluble in the medium but in which the monomer is easily soluble.

Because the spool for the Brownie photo film should shield the photographic film from ambient light in cooperation with the backing paper or leader, the spool must have light-shielding properties. Representative examples of light-shielding agents added to the resin for forming the spool are inorganic compounds as referred to below:

1) Oxide, such as: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, and alumina fiber.
2) Hydroxide, such as: aluminum hydroxide, magnesium hydroxide, and basic magnesium carbonate.
3) Carbonate, such as: calcium carbonate, magnesium carbonate, dolomite, and danalite.
4) Sulfate and sulfite, such as: calcium sulfate, barium sulfate, ammonium sulfate, and calcium sulfite.
5) Silicate, such as: talc, clay, mica, asbestos, glass fiber, glass balloon, glass bead, calcium silicate, montmorillonite, and bentonite.
6) Carbon, such as: carbon black, graphite, carbon fiber, and carbon hollow sphere.
7) Iron powder, copper powder, lead powder, tin powder, stainless steel powder, pearlescent pigment, aluminum powder, molybdenum sulfide, zeolite, boron fiber, silicon carbide fiber, brass fiber, potassium titanate, lead titanate zirconate, zinc borate, barium metaborate, calcium borate, sodium borate, and aluminum paste.

Among the above, carbon black is preferable, because it causes less fogging of the photographic film, has little influence on photosensitivity and has a great capacity for shielding light, and is not likely to produce spitting or hard spot in polystyrene resin.

Carbon black is classified according to raw materials as gas black, furnace carbon black, channel black, anthracene black, acetylene black, Ketchen carbon black, thermal carbon black, lamp black, oil smoke, pine smoke, animal black, vegetable black, and so forth. Among these, furnace carbon black is preferable in consideration of its light-shielding capacity and cost, as well as because it improves physical properties, and has less influence on photographic properties. Acetylene carbon black and Ketchen carbon black, a denatured by-product, are also preferable as having antistatic properties as well as light-shielding capacity, despite their high cost.

Among the carbon blacks, acceptable examples have pH 6.0–9.0, and more preferably 6.5–8.5 (JIS K-6221), and have an average particle diameter of 10–120 m$\mu$, and more preferably 12–70 m$\mu$. Among these, furnace carbon black is more preferred whose volatile component is at most 3.5%, and desirably at most 1.5% (JIS K-6221), and whose DBP oil absorption is at least 50 ml/100 g, and desirably at least 70 ml/100 g (Method A of oil absorption measurement according to JIS K-6221). Channel carbon black is not preferable because it is expensive, and mostly contains more than 5.0% volatile component so that it causes fogging of the photographic film. Most lamp black is pH 5.0 or less, so it has bad influence on the photographic properties. Therefore, if lamp black should have to be used, its influence on the photographic properties must be searched and found in advance. To prevent adverse influence on the photographic properties, sulfur component of the carbon black should be 0.9% or less, and preferably 0.7% or less measured according to ASTM D 1619-60. Especially, free sulfur component should preferably be 0.1% or less, and most preferably 0.05% or less.

Preferred examples of commercially available carbon black for the spool are the same as set forth above for the backing paper or leader.

A preferable addition of the furnace carbon black is 0.05–3.00 wt. %, in view of the price, physical strength of the spool, light-shielding capacity, influence on photographic properties of the photo film, injection moldability, and appearance. Addition of less than 0.05 wt. % furnace carbon black results in insufficient light-shielding capacity, so the photographic film is fogged, unless the spool is thickened enough. Making the spool thick enough for obtaining sufficient light-shielding capacity with 0.05 wt. % furnace carbon black lengthens the molding cycle so much that molding failure such as sink marks can occur, and in addition it increases the necessary amount of resin and thus raises the material cost. Addition of more than 3.00 wt. % results in raising the cost and lowering the physical strength of the spool, and weld lines are liable to occur. Moreover, the spool tends to absorb moisture, which can adversely affect the photographic film, and deteriorate the appearance of the spool (silver streaking, uneven or lowered glossiness), and weaken the surface of the spool, i.e. the spool can easily get scratched or worn. Fluidity of the resin decreases to lower the moldability.

As the dispersing agent for the light-shielding agent, one or more of low molecular weight styrene polymer, polyethylene wax, polypropylene wax, derivatives of these compounds, ethylene-bis-amide compounds and metallic soaps is applicable. A preferable example is zinc stearate or magnesium stearate. Carbon black containing master-batch pellet can contain the dispersing agent to an extent that has no harm on the product. As for zinc stearate, however, a preferable range is 0.01–0.3 wt. % in the final molded product. If the loading of zinc stearate is more than 0.3 wt. % of the final product, glossiness of the product and sweating on the metal molds are increased so much that obstacles may stick to the final molded product. In contrast, loading of less than 0.01 wt. % zinc stearate would have little dispersing effect.

The spool of the invention may contain lubricant, in order that the edges of the backing paper or leader may smoothly slide on the spool, and thus the tightness of the photo film roll on the spool may be further improved. Examples of lubricants applicable for this purpose are referred to below, as well as manufacturers thereof:

1. Fatty acid amide lubricants

A. Saturated fatty acid amide lubricants:

Behenic acid amide lubricants, such as DIAMIDE-KN (trade name; manufactured by Nippon Kasei Chemical Co., Ltd.); and Stearic acid amide lubricants, such as ARMIDE-HT (trade name; manufactured by Lion Oil and Fats Co., Ltd.), ALFLOW-S-10 (trade name; manufactured by Nippon Oil and Fats Co., Ltd.), fatty acid AMAMID-AP-1 (trade name; manufactured by Nippon Kasei Chemical Co., Ltd.), AMIDE-S and AMIDE-T (trade name; manufactured by Nitto Chemical Industry Co., Ltd.), NEWTRON-2 (trade name; manufactured by Nippon Fine Chemical Co., Ltd.).

B. Hydroxy stearic acid amide lubricants:

Palmitic acid lubricants, such as NEWTRON-S-18 (trade name; manufactured by Nippon Fine Chemical Co., Ltd.), AMIDE-P (trade name; manufactured by Nitto Chemical Industry Co., Ltd.); and Lauric acid amide lubricants, such as ARMIDE-C (trade name; manufactured by Lion Akzo Co., Ltd.), DIAMID (trade name; manufactured by Nippon Kasei Chemical Co., Ltd.).

C. Unsaturated fatty acid amide lubricants:

Erucic acid amide lubricants, such as ALFLOW-P-10 (trade name; manufactured by Nippon Oil and Fats Co., Ltd.), NEWTRON-S (trade name; manufactured by Nippon Fine Chemical Co., Ltd.), LUBROL (trade name; manufactured by I.C.I), and DIAMID-L-200 (trade name; manufactured by Nippon Kasei Chemical Co., Ltd.); and Oleic acid amide lubricants, such as ARMO SLIP-CP (trade name; manufactured by Lion Akzo Co., Ltd.), NEWTRON and NEWTRON-E-18 (trade names; manufactured by Nippon Fine Chemical Co., Ltd.), AMIDE-O (trade name; manufactured by Nitto Chemical Industry Co., Ltd.), DIAMID-O-200 and DIAMID-G-200 (trade names; manufactured by Nippon Kasei Chemical Co., Ltd.), ALFLOW-E-10 (trade name; manufactured by Nippon Oil and Fats Co., Ltd.), and fatty acid AMIDE-O (trade name; manufactured by Kao Corporation).

D. Bis fatty acid amide lubricants:

Methylene bis behenic acid amide lubricants, such as DIAMID-NK-BIS (trade name; manufactured by Nippon Kasei Chemical Co., Ltd.);

Methylene bis stearic acid amide lubricants, such as DIAMID-200-BIS (trade name; manufactured by Nippon Kasei Chemical Co., Ltd.), ARMO WAX (trade name; manufactured by Lion Akzo Co., Ltd.), and BISAMIDE (trade name; manufactured by Nitto Chemical Industry Co., Ltd.);

Methylene bis oleic acid amide lubricants, such as LUBRON-O (trade name; manufactured by Nippon Kasei Chemical Co., Ltd.);

Ethylene bis stearic acid amide lubricants, such as ARMO SLIP EBS (trade name; manufactured by Lion Akzo Co., Ltd.); and Hexamethylene bis stearic acid amide lubricants, such as AMIDE-65 (trade name; manufactured by Kawaken Fine Chemical Co., Ltd.);

Hexamethylene bis oleic acid amide lubricants, such as AMIDE-60 (trade name; manufactured by Kawaken Fine Chemical Co., Ltd.), etc.

2. Non-ionic surface active agent lubricants

ELECTRO STRIPPER TS-2 and ELECTRO STRIPPER TS-3 (trade name; manufactured by Kao Corporation), etc.

3. Hydroxy carbonate lubricants

Liquid paraffin, natural paraffin, micro wax, synthetic paraffin, polyethylene wax (preferably 6,000 or less in molecular weight), polypropylene wax (preferably 6,000 or less in molecular weight), chlorinated hydrocarbon, fluorocarbon, etc.

4. Fatty acid lubricants

Higher fatty acid (of which the preferable number of carbon atoms is $C_{12}$ or more, such as caproic acid, stearic acid, oleic acid, erucic acid, palmitic acid), oxy fatty acid, etc.

5. Ester lubricants

Fatty acid lower alcohol ester, fatty acid polyvalent alcohol ester, fatty acid polyglycol ester, fatty acid fatty alcohol ester, etc.

6. Alcohol lubricants

Polyvalent alcohol, polyglycol, polyglycerol, etc.

7. Metallic soaps

Compounds of higher fatty acids such as lauric acid, stearic acid, succinic acid, stearyl lactate, benzoic acid, hydroxy stearic acid, lactic acid, phthalic acid, ricinoleic acid, naphthenic acid, oleic acid, palmitic acid and erucic acid, and metals such as Li, K, Na, Mg, Ca, Sr, Ba, Zn, Cd, Al, Sn, Pb and Cd. Among these, magnesium stearate, calcium stearate, zinc stearate and magnesium oleate are preferable.

8. Montanic acid ester partial saponified compounds.

9. Silicone lubricants

Dimethyl polysiloxane of various grades and denatured compounds thereof (manufactured by Sinetsu Silicone Co., Ltd., and Toray Silicone Co., Ltd.).

It is the most preferable to add 0.05–2.20 wt. % dimethyl polysiloxane lubricant of organo-polysiloxane group having a viscosity of 1,000 CS to 60,000 CS.

Examples of other additive agents which may be added as required to the resin for forming the spool are antioxidant, photo-stabilizer, ultraviolet absorber, nucleator and anti-static agent. Also filler such as alumina, kaoline, clay, calcium carbonate, mica, talc, titanium oxide and silica, or glass roving, metal fiber, glass fiber, glass milled fiber, carbon fiber may be added to reduce the shrinkage of the spool.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. In combination, a take-up spool and a roll photo film, said take-up spool comprising:

(A) a spool core;

(B) a slit, formed in said spool core to extend in an axial direction, being open in first and second openings, and defined between first and second walls;

(C) an erect plate, disposed to project from said first wall toward said second wall, extended crosswise to said axial direction, said erect plate having first and second inclined edges, confronted respectively with said first and second openings, and inclined with reference to said first wall;

(D) a pair of lateral claws, disposed on respective lateral faces of said erect plate to extend in said axial direction; and (E) at least one press rib, disposed to project from said second wall toward said first wall;

said roll photo film comprising:

(a) a photo filmstrip having first and second ends;

(b) a trailer, disposed to project from said first end, said photo filmstrip being wound in a form of a roll with said trailer wound inwards;

(c) a leader, disposed to project from said second end, wound about said roll of said photo filmstrip, for preventing ambient light from being incident upon said photo filmstrip; and (d) at least one retainer hole formed in said front end of said leader, said retainer hole including:

(d1) a retaining region, having a retaining edge, and engageable with said lateral claws; and (d2) a releasing region having a rectangular shape, formed with said retaining region to extend toward said photo filmstrip, and having a size for allowing passage of said lateral claws.

2. A combination as defined in claim 1, wherein at least a central portion of said retaining edge is curved, and said releasing region is a quadrilateral longer in said axial direction.

3. A combination as defined in claim 2, wherein said curved central portion is arc-shaped.

4. A combination as defined in claim 3, wherein said lateral claws and said arc-shaped retaining edge satisfy a condition of:

$$K \geq 0.5 \text{ mm}$$

where K is defined by a formula of:

$$K = L - \{s^2 + 2a \cdot \sin\theta (r^2 - s^2)^{1/2} - (a \cdot \sin\theta)^2\}^{1/2}$$

where L is a distance from an end of said lateral claws to a central position of said erect plate as viewed in said axial direction;

a is a distance from said lateral claws to said first and second inclined edges in an inserting direction of said leader;

θ is an inclining angle of said first and second inclined edges with reference to said inserting direction;

r is a radius of said arc-shaped retaining edge; and s is a half of a thickness of said erect plate with reference to said axial direction;

wherein said lateral claws and said releasing region satisfy conditions of:

$$2L < \alpha \leq 6L \text{ and}$$
$$d < \beta \leq 2d$$

where α is an open width of said releasing region in said axial direction;

d is a width of said lateral claws in said inserting direction; and

β is an open width of said releasing region in said inserting direction.

5. A combination as defined in claim 4, wherein K is a length of an overlapped portion where an end of said lateral claws overlaps on said retaining edge with reference to said axial direction while said retaining region is engaged with said erect plate.

6. A combination as defined in claim 5, wherein said retaining region has a pair of confronted inclined edges between which an interval decreases in a direction away from said releasing region.

7. A combination as defined in claim 1, further comprising a claw indicia, disposed on said spool core in an outside of said first wall, for indicating existence of said erect plate and said lateral claws.

8. A combination as defined in claim 1, wherein said lateral claws satisfy a condition of:

$$L \leq [\{43.30 + (a \cdot \sin\theta + H/\cos\theta)^2\} a \cdot \sin\theta/(a \cdot \sin\theta + H/\cos\theta) - (a \cdot \sin\theta)^2]^{1/2}$$

where L is a distance from an end of said lateral claws to a central position of said erect plate as viewed in said axial direction;

a is a distance from said lateral claws to said first and second inclined edges in an inserting direction of said leader;

θ is an inclining angle of said first and second inclined edges with reference to said inserting direction; and H is a height of ends of said lateral claws confronted with said first and second openings with reference to said first wall;

wherein said retainer hole satisfies a condition of:

$$2.8 \text{ mm} \leq r \leq 6 \text{ mm}$$

where r is a radius of said retainer hole;

wherein said retainer hole and said lateral claws satisfy a condition of:

$$K \geq 0.5 \text{ mm}$$

where K is defined by a formula of:

$$K = L - \{s^2 + 2a \cdot \sin\theta (r^2 - s^2)^{1/2} - (a \cdot \sin\theta)^2\}^{1/2}$$

where s is a half of a thickness of said erect plate with reference to said axial direction.

9. A combination as defined in claim 8, wherein said front end of said leader is shaped without a bend line extending crosswise to said inserting direction.

10. A combination as defined in claim 8, wherein said lateral claws are so shaped as to be prevented from interference with lateral points of said front end of said leader while a center of said front end contacts one of said first and second inclined edges during advance of said front end in said slit.

11. A combination as defined in claim 10, wherein said leader further includes a narrowed portion, disposed on said front end, and having a width D1;

said at least one press rib is first and second press ribs, arranged at a predetermined interval equal to or greater than said width D1.

12. A combination as defined in claim 11, wherein said front end of said leader further includes first and second inclined sides connected with said narrowed portion, confronted with each other, and inclined with an interval increasing toward said photo filmstrip, said leader being pressed by said first and second press ribs between said first and second inclined sides.

13. A combination as defined in claim 1, wherein said leader has longitudinal loop rigidity of 200–400 g/mm with a width of 60 mm;

said front end of said leader includes a narrowed portion having a width D1 of 11–23 mm.

14. A combination as defined in claim 13, wherein said longitudinal loop rigidity is stress in a longitudinal direction of said leader, said stress being obtained by steps of forming a loop at a diameter of 10 mm by rounding said leader in said longitudinal direction, said leader having said width of 60 mm, compressing said loop by 2 mm, and then loosening said loop by 1 mm while said stress is applied thereto.

15. A combination as defined in claim 13, wherein said leader is constituted by material produced from at least one selected from natural pulp, synthetic fiber, synthetic pulp, reprocessed pulp and wastepaper.

16. A combination as defined in claim 15, wherein said at least one press rib comprises first and second press ribs arranged at a predetermined interval D2, said interval D2 being equal to or greater than said width D1;

said front end of said leader further includes first and second inclined sides connected with said narrowed portion, confronted with each other, and inclined with an interval increasing from said width D1 to said width of said leader, said leader being pressed by said first and second press ribs between said first and second inclined sides.

17. A combination as defined in claim 16, wherein said retainer hole is disposed between said first and second inclined sides.

18. In combination, a roll photo film and a take-up spool, said roll photo film comprising:

(a) a photo filmstrip having first and second ends;

(b) a trailer, disposed to project from said first end, said photo filmstrip being wound in a form of a roll with said trailer wound inwards;

(c) a leader, disposed to project from said second end, wound about said roll of said photo filmstrip, for preventing ambient light from being incident upon said photo filmstrip; and (d) at least one retainer hole formed in a front end of said leader;

said take-up spool comprising:

(A) a spool core;

(B) a slit, formed in said spool core to extend in an axial direction, being open in first and second openings, defined between first and second walls;

(C) an erect plate, disposed to project from said first wall toward said second wall, extended crosswise to said axial direction, and inserted in said retainer hole, said erect plate having first and second inclined edges, confronted respectively with said first and second openings, and inclined with reference to said first wall;

(D) a pair of lateral claws, disposed on respective lateral faces of said erect plate to extend in said axial direction, and adapted to retain said erect plate on said retainer hole; and (E) at least one press rib, disposed to project from said second wall toward said first wall;

wherein said lateral claws satisfy a condition of:

$$L \leq [\{43.30+(a\cdot\sin\theta+H/\cos\theta)^2\}a\cdot\sin\theta/(a\cdot\sin\theta+H/\cos\theta)-(a\cdot\sin\theta)^2]^{1/2}$$

where L is a distance from an end of said lateral claws to a central position of said erect plate as viewed in said axial direction;

a is a distance from said lateral claws to said first and second inclined edges in an inserting direction of said leader;

θ is an inclining angle of said first and second inclined edges with reference to said inserting direction; and H is a height of ends of said lateral claws confronted with said first and second openings with reference to said first wall;

wherein said retainer hole satisfies a condition of:

$$2.8 \text{ mm} \leq r \leq 6 \text{ mm}$$

where r is a radius of said retainer hole;

wherein said retainer hole and said lateral claws satisfy a condition of:

$$K \geq 0.5 \text{ mm}$$

where K is defined by a formula of:

$$K=L-\{s^2+2a\cdot\sin\theta(r^2-s^2)^{1/2}-(a\cdot\sin\theta)^2\}^{1/2}$$

where s is a half of a thickness of said erect plate with reference to said axial direction.

19. A roll photo film comprising:

(a) a supply spool;

(b) a photo filmstrip having first and second ends;

(c) a trailer, disposed to project from said first end, said photo filmstrip being wound about said supply spool in a form of a roll with said trailer wound inwards; and (d) a leader, disposed to project from said second end, wound about said roll of said photo filmstrip, for preventing ambient light from being incident upon said photo filmstrip;

wherein said leader has longitudinal loop rigidity of 200–400 g/mm with a width of 60 mm;

said leader includes a narrowed portion having a width of 11–23 mm.

* * * * *